(12) United States Patent
Mullen et al.

(10) Patent No.: US 12,124,583 B2
(45) Date of Patent: Oct. 22, 2024

(54) TRUSTED REPOSITORY REVIEW

(71) Applicant: International Business Machines Corporation, Armonk, NY (US)

(72) Inventors: Shawn P. Mullen, Buda, TX (US); Corinne Anne Leopold, Austin, TX (US); Anton Aleksandrov, Austin, TX (US); Zsolt Ádám Czinege, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 17/303,248

(22) Filed: May 25, 2021

(65) Prior Publication Data

US 2022/0382875 A1    Dec. 1, 2022

(51) Int. Cl.
*G06F 21/57*    (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,307,351 B2 | 11/2012 | Weigert | |
| 8,726,344 B1 * | 5/2014 | Amidon | H04L 63/107 713/168 |
| 8,869,284 B1 | 10/2014 | Mao | |
| 9,141,378 B2 | 11/2015 | Fox et al. | |
| 9,361,094 B1 | 6/2016 | Xie et al. | |
| 9,727,591 B1 * | 8/2017 | Sharma | G06F 8/71 |
| 9,959,329 B2 | 5/2018 | Guisado | |
| 10,412,113 B2 * | 9/2019 | Hanley | G06N 3/08 |
| 10,474,556 B2 | 11/2019 | Ranjan et al. | |
| 11,537,400 B1 * | 12/2022 | Zhang | G06F 8/51 |

(Continued)

FOREIGN PATENT DOCUMENTS

| | | |
|---|---|---|
| CN | 104992081 A | 10/2015 |
| CN | 108984416 A | 12/2018 |

(Continued)

OTHER PUBLICATIONS

"Undocumented Open Source Leaves a Gap in Your Application Security Strategy," White Paper, Palamida, Inc., Copyright 2008, 9 pages. https://dsimg.ubm-us.net/envelope/71642/350702/1205266602568_Undocumented_Open_Source_Leaves_a_Gap.pdf.

(Continued)

*Primary Examiner* — Fatoumata Traore
(74) *Attorney, Agent, or Firm* — Yee & Associates, P.C.

(57) ABSTRACT

A method performs a trust review of repositories is provided. A computer system identifies security criteria for the trust review. The computer system applies the security criteria on a repository under evaluation. The computer system determines a recommendation for the repository under evaluation using a comparison of a result of applying the security criteria on the repository under evaluation to a trust baseline for a set of trusted repositories. According to other illustrative embodiments, a trust system and a computer program product for performing a trust review are provided.

25 Claims, 13 Drawing Sheets

(56) References Cited

U.S. PATENT DOCUMENTS

| | | | |
|---|---|---|---|
| 2009/0199017 A1* | 8/2009 | Lange | G06F 21/79 |
| | | | 713/194 |
| 2010/0162039 A1* | 6/2010 | Goroff | G06F 11/1451 |
| | | | 714/E11.03 |
| 2012/0316905 A1 | 12/2012 | Miller, Jr. et al. | |
| 2015/0012481 A1 | 1/2015 | Guisado | |
| 2016/0292066 A1 | 10/2016 | Stevens et al. | |
| 2017/0344363 A1 | 11/2017 | Chen et al. | |
| 2018/0332065 A1* | 11/2018 | Gupta | H04L 63/101 |
| 2019/0258565 A1 | 8/2019 | Ranjan et al. | |
| 2019/0279261 A1 | 9/2019 | Pappas et al. | |
| 2020/0177444 A1* | 6/2020 | Nelson-Gal | H04L 67/56 |
| 2021/0320944 A1* | 10/2021 | Ogle | G06N 20/00 |
| 2022/0164171 A1* | 5/2022 | Johnson | G06F 8/77 |

FOREIGN PATENT DOCUMENTS

| | | |
|---|---|---|
| CN | 109308628 A | 2/2019 |
| CN | 110276171 A | 9/2019 |
| CN | 112434299 A | 3/2021 |
| EP | 3160078 A1 * | 4/2017 |

OTHER PUBLICATIONS

Mell et al., "The NIST Definition of Cloud Computing," Computer Security Division, National Institute of Standards and Technology, Jan. 2011, 7 pages.

* cited by examiner

```
{
  "passing_limit": 80,  ~910
  "criteria":{
    "trusted_owner":{                                                              902
      "description": "if repo is owned by a user that has at least one repo on our trusted list then we have higher confidence in this repo.",
      "metric": "Bool:whether the owner of the repo owns at least one of the repos in our trusted repo list." ~912
      "api": "https://api.github.com/repos/${RUE}",  ~914
      "weight": 1  ~916
    },
    "branch_protection":{                                                          904
      "description": "Get pull request review protection https://docs.github.com/en/rest/reference/repos#get-pull-request-review-protection",
      "metric": "Bool: whether any of the branches is branch protected.",  ~918
      "api": "https://api.github.com/repos/${RUE}/branches",  ~920
      "weight": 1  ~922
    },
    "languages":{                                                                  906
      "description": "This criteria the languages used in the repo and compares against languages supported by cloud scanners. All cloud software is scanned. But scanners do not cover all software. Languages that are covered are based on CRA (Code Risk Analyzer). CRA basically uses the Snyk.io database under the covers. Therefore, assume the same language coverage https://snyk.io/vuln. Now, how to score it? I suggest percentage of coverage. If only language is go, the 100; through out Makefile of other side note languages. see: "https://docs.github.com/en/rest/reference/repos#list-repository-languages",
      "metric": "Percentage of the code written in languages that is able to scan.",  ~924
      "api": "https://api.github.com/repos/${RUE}/languages",  ~926
      "tolerance": 90,  ~928
      "weight": 1  ~930
    },
    "commit_activity":{                                                            908
      "description": "Contributor commit activity, past year.",
      "metric": "Total commits.",  ~932
      "api": "https://api.github.com/repos/${RUE}/stats/commit_activity",  ~934
      "percentile_tolerance": 25,  ~936
      "weight": 1  ~938
    }
```

FIG. 9

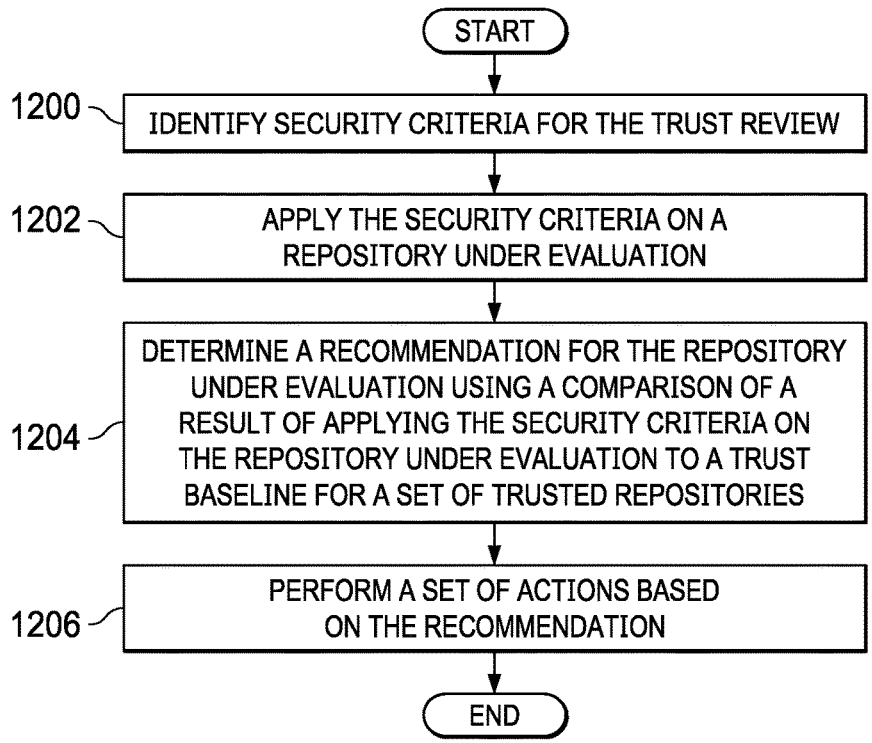
FIG. 12
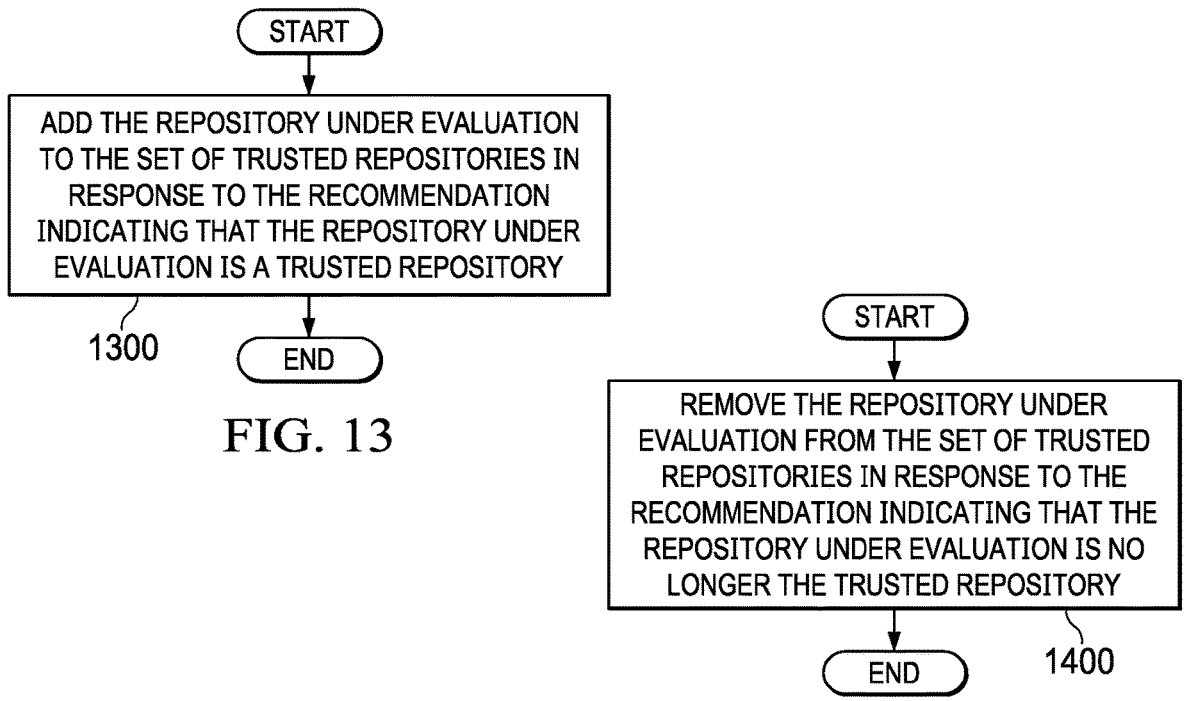
FIG. 13
FIG. 14

TRUSTED REPOSITORY REVIEW

BACKGROUND

1. Field

The disclosure relates generally to an improved data processing system and more specifically to evaluating trusted repositories.

2. Description of the Related Art

A developer can access repositories to build and distribute containers in a cloud computing environment. A repository contains source materials used in a build process. In other words, a repository is a storage location for software packages or files. A table of contents and can be included in repository along with metadata. A repository is also referred to as a "repo".

Repositories can meet various standards and regulations can be present to ensure a desired level security and privacy control of information. For example, NIST Special Publication 800-53 provides a catalog of security and privacy controls for all U.S. federal information systems except those related to national security. This publication as well as other standards or regulations can require that repositories used in developing applications are pulled from approved sources. Further, these sources are also required to be trusted sources, such as repositories used in containers used in various computing environments.

An organization may have a list of approved trusted repositories that can be used for software applications. However, developers often use third-party software across platform as a service (PaaS) from many repositories that may not be on a list of trusted repositories that have been approved for use.

With this situation, code scanners can be used to scan the code in these repositories. Code scanning can be performed to identify vulnerabilities in software. However, although code scanning is helpful in determining the security of a repository, this type of scanning is a separate process from the determining whether a repository is trusted and can be approved for use. Malicious actors, for example, could take advantage of poorly managed repositories and a weak open-source community. This allows malicious actors to position themselves in the community, inject backdoors and other tools of craft, undetectable by source code scanning and bypassing proper repository management controls In determining whether a repository is trusted can include reviewing the results of code scanning but the determination also considers other factors such as how often the repository is updated, how many releases have occurred, how many users are forking the repository, whether the owner of the repository is a trusted entity, end of life, or other factors.

A human review can be performed to determine whether a repository can be trusted and approved for use as a trusted repository. This process, however, is subjective and time-consuming, especially when hundreds or thousands of repositories may need to be considered. Further, this review is subjective with respect to each individual reviewer. As result, different results with respect to whether a repository is trusted can occur with different human reviewers.

Therefore, it would be desirable to have a method and apparatus that take into account at least some of the issues discussed above, as well as other possible issues. For example, it would be desirable to have a method and apparatus that overcome a technical problem with reviewing repositories to identify trusted repositories.

SUMMARY

According to one illustrative embodiment, a method for performing a trust review of repositories is provided. a computer system identifies security criteria for the trust review. The computer system applies the security criteria on a repository under evaluation. The computer system determines a recommendation for the repository under evaluation using a comparison of a result of applying the security criteria on the repository under evaluation to a trust baseline for a set of trusted repositories. According to other illustrative embodiments, a trust system and a computer program product for performing a trust review are provided.

In addition, the illustrative embodiments also add the repository under evaluation to the set of trusted repositories in response to the recommendation indicating that the repository under evaluation is a trusted repository. In one illustrative embodiment the repository under evaluation is a trusted repository in the set of trusted repositories and the repository under evaluation is removed from the set of trusted repositories in response to the recommendation indicating that the repository under evaluation is no longer the trusted repository. Wherein in applying the security criteria to the set of trusted repositories to create the trust baseline, the illustrative embodiments apply the security criteria to the set of trusted repositories to obtain baseline metrics for the set of trusted repositories and create the trust baseline for the set of trusted repositories using the baseline metrics for the set of trusted repositories. Wherein determining the recommendation for the repository under evaluation using the comparison of the result of applying the security criteria on the repository under evaluation to the trust baseline for the set of trusted repositories, illustrative embodiments generate a set of scores for the repository under evaluation from the comparison; determine whether to the repository under evaluation is a trusted repository by applying an acceptance tolerance to acceptance tolerances the score; and determine the recommendation based on whether to the repository under evaluation is the trusted repository.

According to another illustrative embodiment, a method for analyzing a repository under evaluation is provided. A computer system applies security criteria to the repository under evaluation to obtain metrics for the repository under evaluation. The computer system compares the metrics for the repository under evaluation with a trust baseline based on a set of trusted repositories to form a comparison. The computer system determines the recommendation for the repository under evaluation using the comparison. According to other illustrative embodiments, a trust system and a computer program product for performing a trust review are provided.

Further, in the illustrative embodiments, the security criteria is applied to the set of trusted repositories to obtain baseline metrics and the trust baseline is created using the baseline metrics. Wherein determining the recommendation for the repository under evaluation using the comparison, the illustrative embodiments generate a set of scores for the repository under evaluation from the comparison; determine whether to the repository under evaluation is a trusted repository using by applying an acceptance tolerance to the score; and determine the recommendation based on whether to the repository under evaluation is the trusted repository.

As a result, one or more if illustrative embodiments provide a technical effect and practical application for performing trust reviews of repositories in a manner that can result improved the consistency in determining whether a repository is a trusted repository. Further, one or more illustrative embodiments provide a technical effect and practical application increased reliability in trust reviews of repositories using a trust baseline derived from a set of trusted repositories. The accepted tolerance level can be raised or lowered to reflect the organizations security policy and risk appetite.

BRIEF DESCRIPTION OF THE DRAWINGS

FIG. 9 is an illustration of a data structure in the form of a JavaScript object notation data structure in accordance with an illustrative embodiment;

FIG. 12 is a flowchart of a process for performing a trust review in accordance with an illustrative embodiment;

FIG. 13 is a flowchart of a process for performing an action in response to a recommendation in response to a trust review in accordance with an illustrative embodiment;

FIG. 14 is a flowchart of a process for performing an action in response to a recommendation in response to a trust review in accordance with an illustrative embodiment;

DETAILED DESCRIPTION

Figure 1:
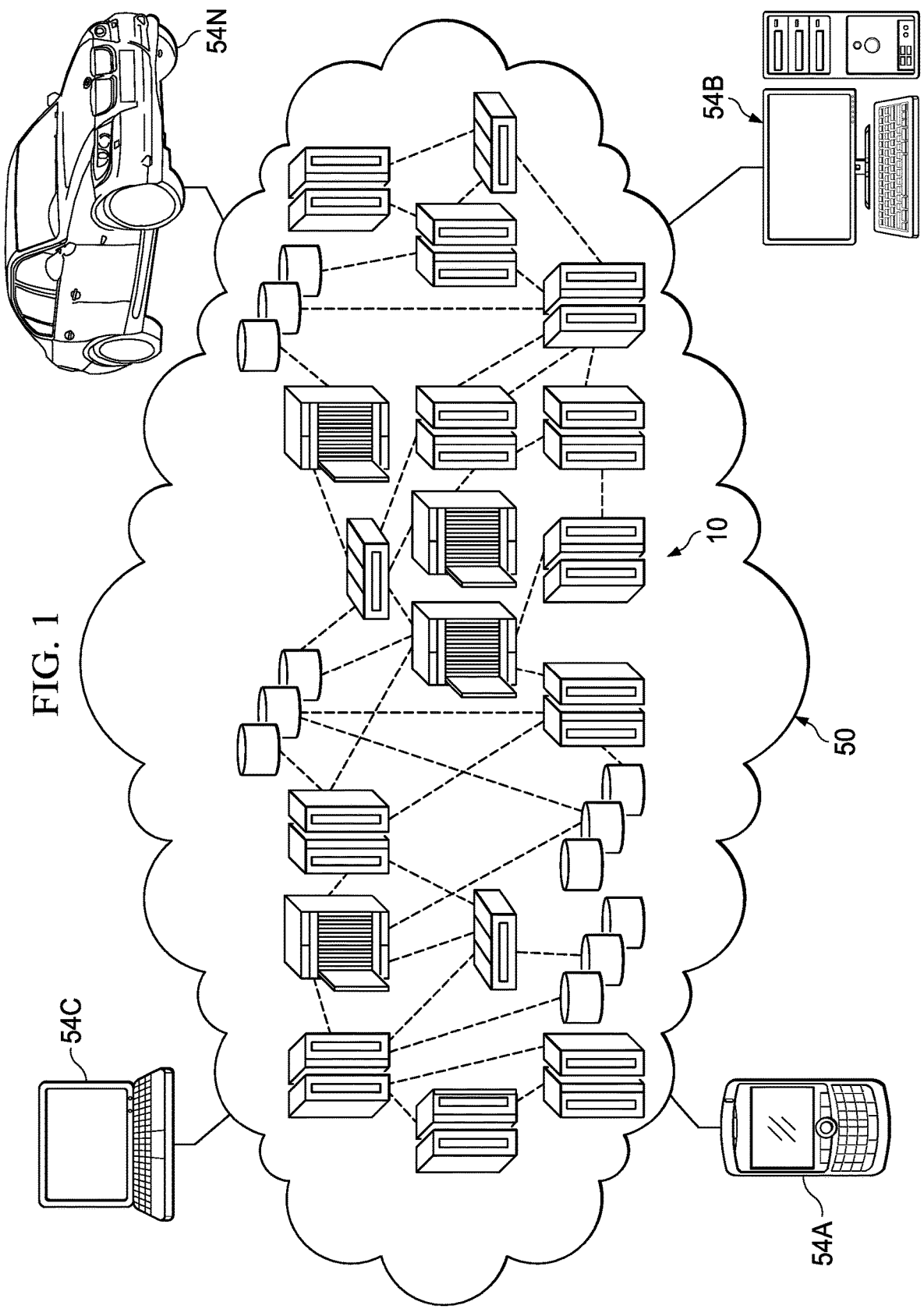
FIG. 1 is a pictorial representation of a network of data processing systems in which illustrative embodiments may be implemented.

The illustrative embodiments recognize and take into account a number of different considerations. For example, the illustrative embodiments recognize and take into account that with the human review of a repository undervaluation (RUE), that various metrics can be applied to the repository in determining whether the repository can be approved as a trusted repository. The illustrative embodiments recognize and take into account that even with simple metrics, determining whether a particular metric is acceptable can be difficult to ascertain. For example, illustrative embodiments recognize and take account that if a metric for repository health is 33, it may be unclear as to whether that value is acceptable or not in evaluating the repository.

Illustrative embodiments recognize and take into account that a more accurate comparison can be made by using a trusted baseline. The illustrative embodiments recognize and take into account that this trusted baseline can be developed by analyzing repositories that have already been approved as trusted repositories.

Thus, the illustrative embodiments provide a method, apparatus, system, and computer program product for performing trusted repository reviews. In one illustrative example, a method performs a trust review of repositories. A computer system identifies security criteria for the trust review. The computer system applies the security criteria on a repository under evaluation. The computer system determines a recommendation for the repository under evaluation using a comparison of a result of applying the security criteria on the repository under evaluation to a trust baseline for a set of trusted repositories. According to other illustrative embodiments, a trust system and a computer program product for performing a trust review are provided.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 in cloud computing environment 50 can communicate with any type of computerized device over any type of network and/or network addressable connection (e.g., using a web browser).

Figure 2:
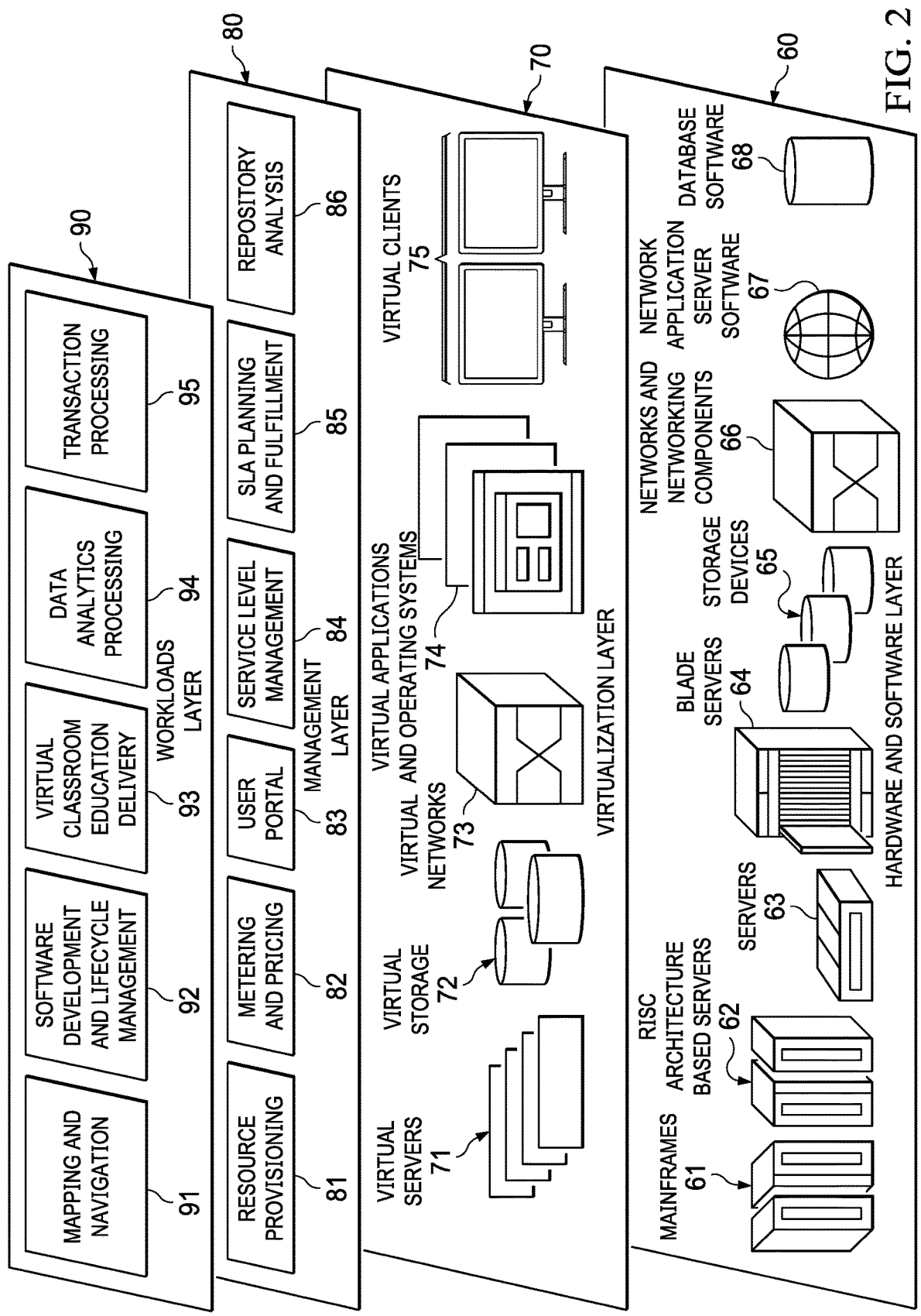
FIG. 2 is a set of functional abstraction layers provided by the cloud computing environment in FIG. 1 is shown.

Referring now to FIG. 2, a set of functional abstraction layers provided by cloud computing environment 50 in FIG. 1 is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In this illustrative example, repository analysis 86 provides analysis of repositories. Repository analysis 86 can identify trusted repositories that can be used to create applications. These applications can be distributed as change to run in in cloud computing environment 50 in FIG. 1 or a network in a physical location that accesses cloud computing environment 50 in FIG. 1.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
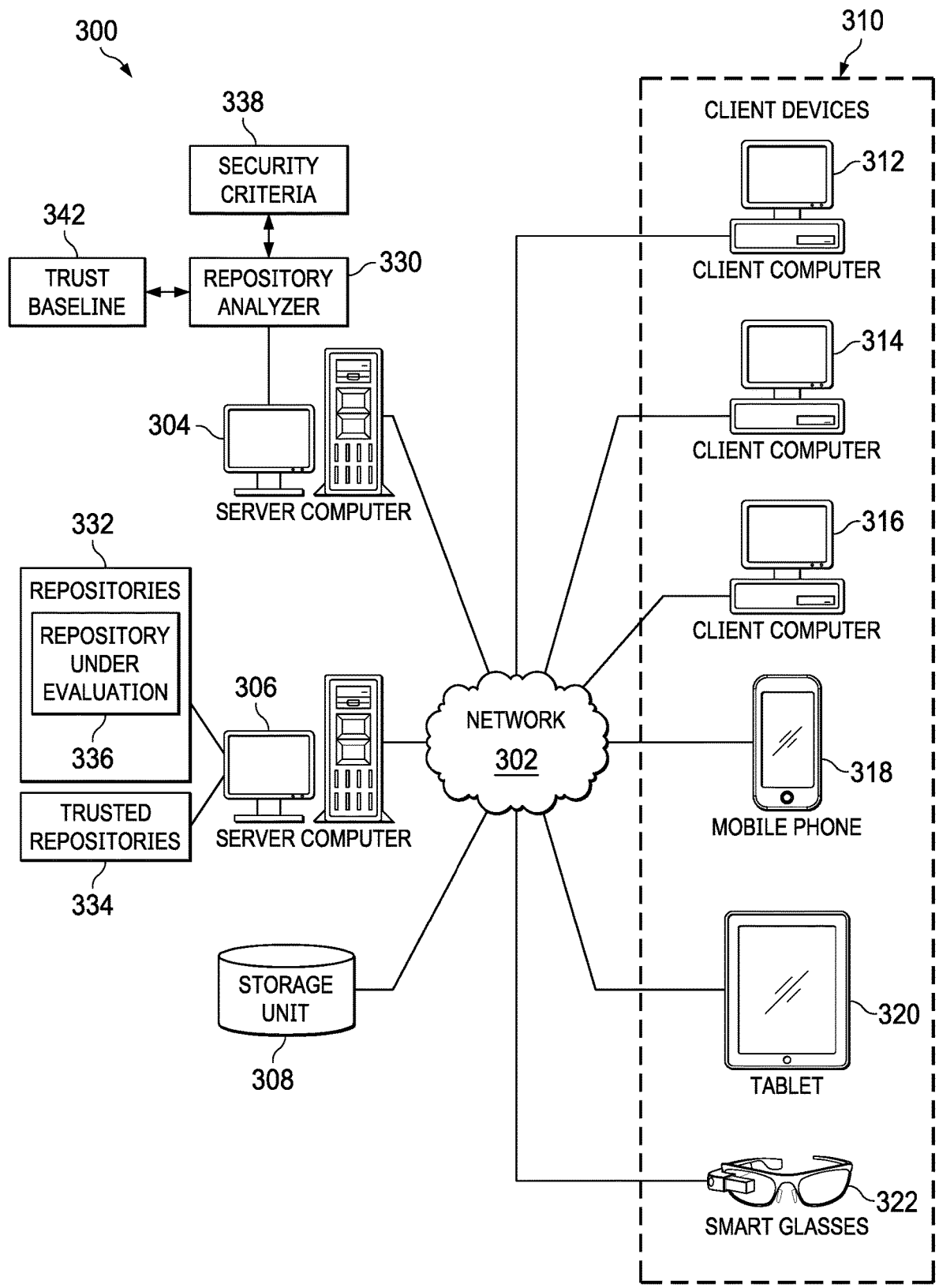
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as an as zero as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program instructions located in network data processing system 300 can be stored on a computer-recordable storage media and downloaded to a data processing system or other device for use. For example, program instructions can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, repository analyzer 330 runs on server computer 304. As depicted, repository analyzer 330 can operate to analyze repositories 332 to determine whether one or more of repositories 332 can be considered trusted repositories 334.

For example, repository analyzer 330 can analyze repository under evaluation (RUE) 336 in repositories 332 for analysis. In this analysis, repository analyzer 330 identifies security criteria 338 for the trust review. Repository analyzer 330 applies security criteria 338 on repository under evaluation 336. That can be applied to repository under evaluation 336. In this illustrative example, the result of applying security criteria 338 to repository under evaluation 336 can be compared to trust baseline 340. In this illustrative example, trust baseline 340 is generated by using the results from applying security criteria 338 to trusted repositories 334. The comparison of the results of applying security criteria 338 to repository under evaluation 336 to trust baseline 340 can be used to make a recommendation for repository under evaluation 336.

This recommendation can take a number of different forms. For example, the recommendation can be to add repository under evaluation 336 to trusted repositories 334, not to add repository under evaluation 336 to trusted repositories 334, a human review of repository under evaluation 336, or other suitable actions can be recommended.

In this illustrative example, the recommendation generated using the comparison of the results with each of mesh. The recommendation can be used by the repository analyzer 330 or another software component to automatically add repository under evaluation 336 to a trusted repository list without requiring human intervention. If the recommendation is not to add repository under evaluation 336 as a trusted repository, then other actions can be taken based on the recommendation.

This analysis can be used to identify additional trusted repositories that can be used in software development. Further, this analysis can be performed as part of a process for continuous integration and continuous deployment (CICD) of software. The recommendations generated by repository analyzer 330 using trust baseline 342 can be used to ensure that containers or other software using repositories are using trusted repositories 334.

As a result, the use of repository analyzer 330 to perform trusted reviews of repositories can reduce different results that can occur from the subjective review performed by human reviewers through the use of trust baseline 342. Further, repository analyzer 330 reduces the time needed to identify trusted repositories and increased speed at which a continuous integration and continuous deployment pipeline can operate.

The illustration of the different components in network data processing system 300 is provided as one example and not meant to limit the manner in which other illustrative examples can be implemented. For example, trusted repositories 334 can be located on a computer another computer instead server computer 306. For example, trusted repositories 334 can be located in server computer 304, client computer 312, storage unit 308, wherein some other suitable location. Further, repositories 332 and trusted repositories 334 can be distributed on multiple computers.

Figure 4:
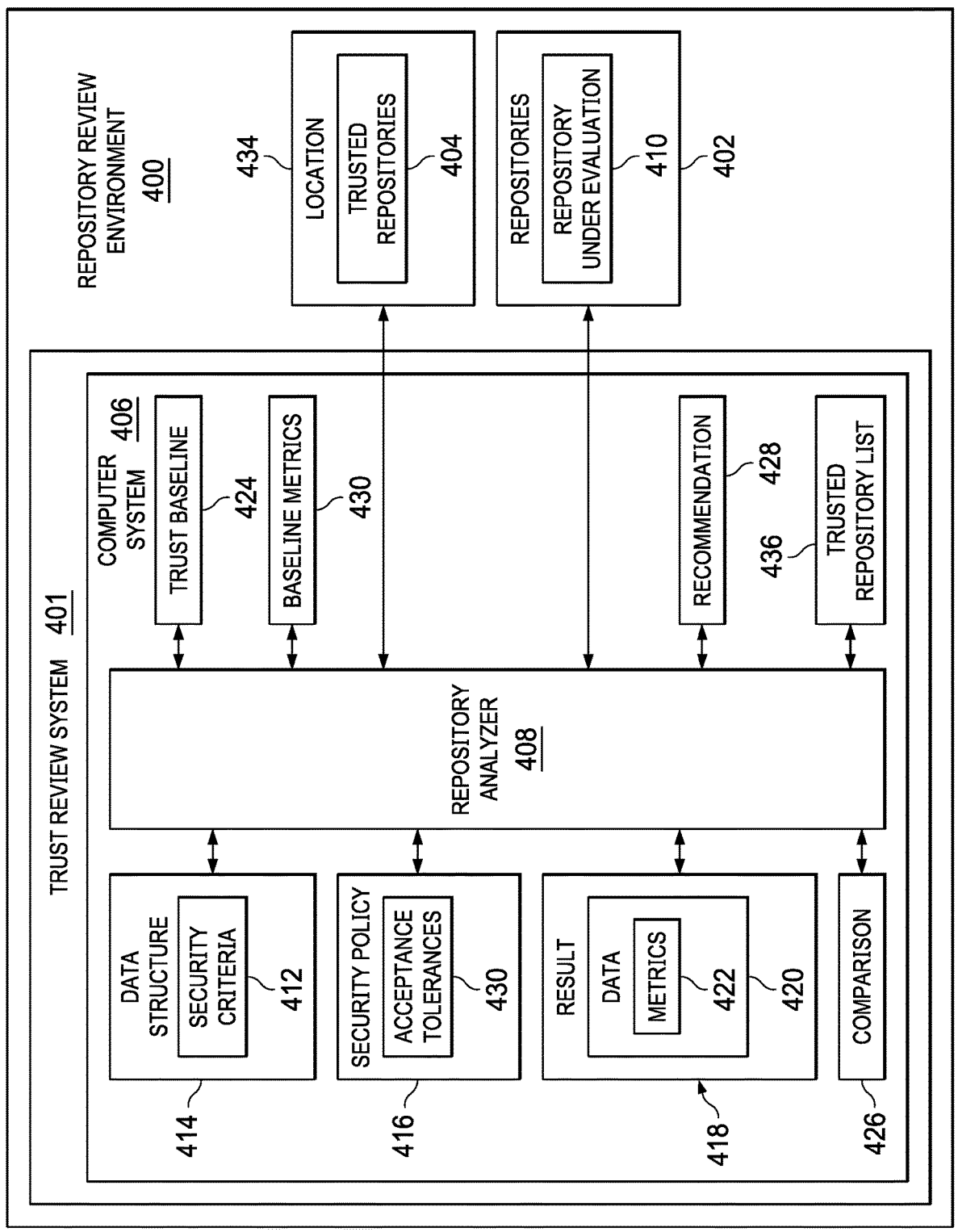
FIG. 4 is a block diagram of a repository review environment in accordance with an illustrative embodiment.

With reference now to FIG. 4, a block diagram of a repository review environment is depicted in accordance with an illustrative embodiment. In this illustrative example, repository review environment 400 includes components that can be implemented in hardware such as the hardware shown in network data processing system 100 in FIG. 1.

In this illustrative example, trust review system 401 can operate to identify repositories 402 that should be included or considered trusted repositories 404. In this illustrative example, trust review system 401 comprises a number of different components. As depicted, trust review system 401 comprises computer system 406 and repository analyzer 408. Repository analyzer 408 can be a process located in another component, part of a management layer, part of the workload layer, or in some other location.

In this illustrative example, repository analyzer 408 can be implemented in software, hardware, firmware or a combination thereof. When software is used, the operations performed by repository analyzer can be implemented in program instructions configured to run on hardware, such as a processor unit. When firmware is used, the operations performed by repository analyzer can be implemented in program instructions and data stored in persistent memory to run on a processor unit. When hardware is employed, the hardware may include circuits that operate to perform the operations in repository analyzer.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 406 is a physical hardware system and includes one or more data processing systems. When more than one data processing system is present in computer system computer system, those data processing systems are in communication with each other using a communications medium. The communications medium can be a network. The data processing systems can be selected from at least one of a computer, a server computer, a tablet computer, or some other suitable data processing system. In this illustrative example, repository analyzer 408 can be located in one data processing system or distributed among multiple data processing systems in computer system 406.

In this illustrative example, one or more of repositories 402 can be analyzed by repository analyzer 408. For example, repository under evaluation (RUE) 410 is a repository selected from repositories 402 for analysis.

Repository analyzer 408 can identify security criteria 412 performing a trust review of repository under evaluation 410. In this illustrative example, this identification of security criteria 412 can be performed in a number of different ways. For example, repository analyzer 408 can identify security criteria 412 from data structure 414.

In this illustrative example, data structure 414 can define how to measure security criteria 412 and can include at least one or a priority for each of security criteria 412 relative to other security criteria. Data structure 414 can be, for example, a configuration file, a JavaScript object notation data structure, a database entry, or some other suitable type of data structure.

In the illustrative example, security criteria 412 can be determined from security policy 416. Security policy 416 can include at least one of a rule, a regulation, a guideline, a standard, or other guidance or requirement. Security policy 416 can be, for example, a software defined security policy, a security model, or other construct that can define what it means for at least one of a system, an organization, or other entity to be secure. In one example, example, security policy 416 defined at least one of procedures, controls, or rules that are directed at organization and security controls across repositories in an organization. Security policy 416 can embody commonly accepted security practices to manage repositories in addition to or in place of other sources such as a law, a statute, a standard, a government regulation, or other sources.

In illustrative example, an organization can take various forms. For example, the organization can be a corporation, a business, a partnership, a nonprofit, a government agency, the city, a consortium, or some other entity.

In this illustrative example, security criteria 412 are measures that can be applied to repository under evaluation 410. These measures can be any measure that provides information that can be used to perform the trust review of repository under evaluation 410.

Security criteria 412 can include a number of different measures. For example, without limitation, security criteria 412 can be selected from at least one of a separation of duties, review and approval requirements for code changes, trusted repo owner; testing enforcement, software development life cycle (SDLC), commits activity, a number of unique contributors, a number of updates in a 1 year time period, maturity thru release matrices, continuous integration/continuous deployment (CI/CD) compatibility, a percentage language used to create the 3rd party offering and analyzing it against the user's CI/CD scanner coverage, industry support, a number of major contributors, stargazer count, fork activity, security controls, branch protections via pull request examinations security, or other criteria that can be used to evaluate the security of software components in the repository.

The application of security criteria 412 to repository under evaluation 410 generates result 418. In this illustrative example, result 418 comprises data 420 that can take the form of metrics 422 or can be used to determine metrics 422. A metric in metrics 422 can be determined for each security criteria in security criteria 412. In some cases, the data can be processed to generated values for metrics 422.

In this illustrative example, metrics 422 are values for security criteria 412. Metrics 422 can take a number of different forms. For example, metrics 422 can be a binary, a number, a percentage, or some other manner data can be returned from applying security criteria 412 to repository under evaluation 410.

As depicted, repository analyzer 408 can compare metrics 422 for repository under evaluation 410 with trust baseline 424 to form comparison 426. In this illustrative example, trust baseline 424 is based on a set of trusted repositories 404. Trust baseline 424 can comprise baseline metrics 430 determined for the set of trusted repositories 404.

As used herein, "a set of" when used with reference to items means one or more items. For example, a set of trusted repositories 404 is one or more trusted repositories.

Repository analyzer 408 can determine recommendation 428 for repository under evaluation 410 using comparison 426. For example, repository analyzer 408 can determine recommendation 428 for repository under evaluation 410 using comparison 426 of results 418 of applying security criteria 412 by repository under evaluation to trust baseline 424 for a set of trusted repositories 404.

Recommendation 428 can be based on security policy 416 a set of acceptance tolerances 432. For example, recommendation 428 can be based on how close metrics 422 are to trust baseline 424 in which the set of acceptance tolerances 432 determines when metrics 422 are close enough to trust baseline 424. For example, recommendation 428 can be based on the set of acceptance tolerances 432 defining how many of metrics 422 need to meet or exceed threshold in trust baseline 424 for repository under evaluation 410 to be considered a trusted repository. As another example, each metric in metrics 422 can have a percentile ranking determined by comparison 426. The set of acceptance tolerances 432 can define desired percentile rankings needed for repository under evaluation 410 to be considered a trusted repository.

Recommendation 428 can take a number of different forms. For example, recommendation 428 can comprise at least one of a rating of repository under evaluation 410 relative to the set of trusted repositories 404, an indication of whether repository under evaluation 410 is a trusted repository, a recommended action, or a categorization of the repository under evaluation 410 under an industry standard, or some other suitable recommendation.

In the illustrative example, repository analyzer 408 can add repository under evaluation 410 to the set of trusted repositories 404 in response to response to recommendation 428 indicating that repository under evaluation 410 is a trusted repository. The adding of repository under evaluation 410 to the set of trusted repositories 404 can include at least one of placing repository under evaluation 410 in location 434 of the set of trusted repositories, adding repository under evaluation 410 to trusted repository list 436, or some other suitable action.

In another illustrative example, repository under evaluation 410 can be a trusted repository in the set of trusted repositories 404. In this example, distrust review can be performed to determine whether any of the set of trusted repositories 404 can no longer be considered trusted repositories. With this type of review, repository analyzer 408 can remove repository under evaluation 410 from the set of trusted repositories in response to recommendation 428 indicating that repository under evaluation 410 is no longer the trusted repository.

In the illustrative example, trust baseline 424 can be generated by applying security criteria 412 to the set of trusted repositories 404 to obtain baseline metrics 430. A baseline metric in baseline metrics 430 is obtained for each trusted repository in the set of trusted repository 404 for each security criteria in security criteria 412. In this example, a one-to-one correspondence between metrics 422 and baseline metrics 430 are present. Baseline metrics 430 are used to create trust baseline 424.

In the illustrative examples, one or more technical solutions are present that overcome a technical problem with reviewing repositories to identify trusted repositories As a result, one or more technical solutions may provide a technical effect of reducing the time needed to review the balance or tens of thousands of repositories to determine which of those repositories can be considered trusted repositories for use in software. Further, one or more illustrative examples provide one or more technical solutions that can reduce the subjectiveness that occurs with current techniques in which human reviewers are used. One or more illustrative examples can provide one or more technical solutions that removes subjectiveness of reviews through a data-driven process that determines a relative trust of repositories under review with respect to trusted repositories.

As result, one or more of the illustrative examples provide one or more technical solutions that eliminates issues with current techniques involving a subjective manual review. The illustrative examples use a trust baseline established from existing trusted repositories is used as a measure for determining whether a repository can be trusted repository. In the illustrative examples, the trust baseline is established using security criteria applied to the trusted repositories. Further, the illustrative examples can apply the same security criteria to a repository under evaluation. The results of the application of the security criteria can be used to generate metrics that compared to the trusted baseline. The comparison can be used to determine a recommendation, which can include, for example, adding the repository under evaluation as a trusted repository, recommending a human review of the repository under evaluation, not adding the repository under evaluation as a trusted repository, or some other suitable recommendation.

The illustration of repository review environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, repositories 402 and trusted repositories 404 are shown as being located outside of computer system 406. In some illustrative examples, at least one of repositories 402 or trusted repositories 404 can be located in computer system 406.

As another example, one or more trust baselines in addition to trust baseline 424 can be present in computer system. With multiple trust baselines, these baselines can be for multiple sets of trusted repositories. For example, trusted repositories can be grouped into sets of trusted repositories based on various factors. For example, a first set of trusted repositories can be one or more repositories for software components used in database applications. A second set of trusted repositories can be one or more repositories for software components used in commercial transactions. A trust baseline can be generated for each of these sets of repositories.

Figure 5:
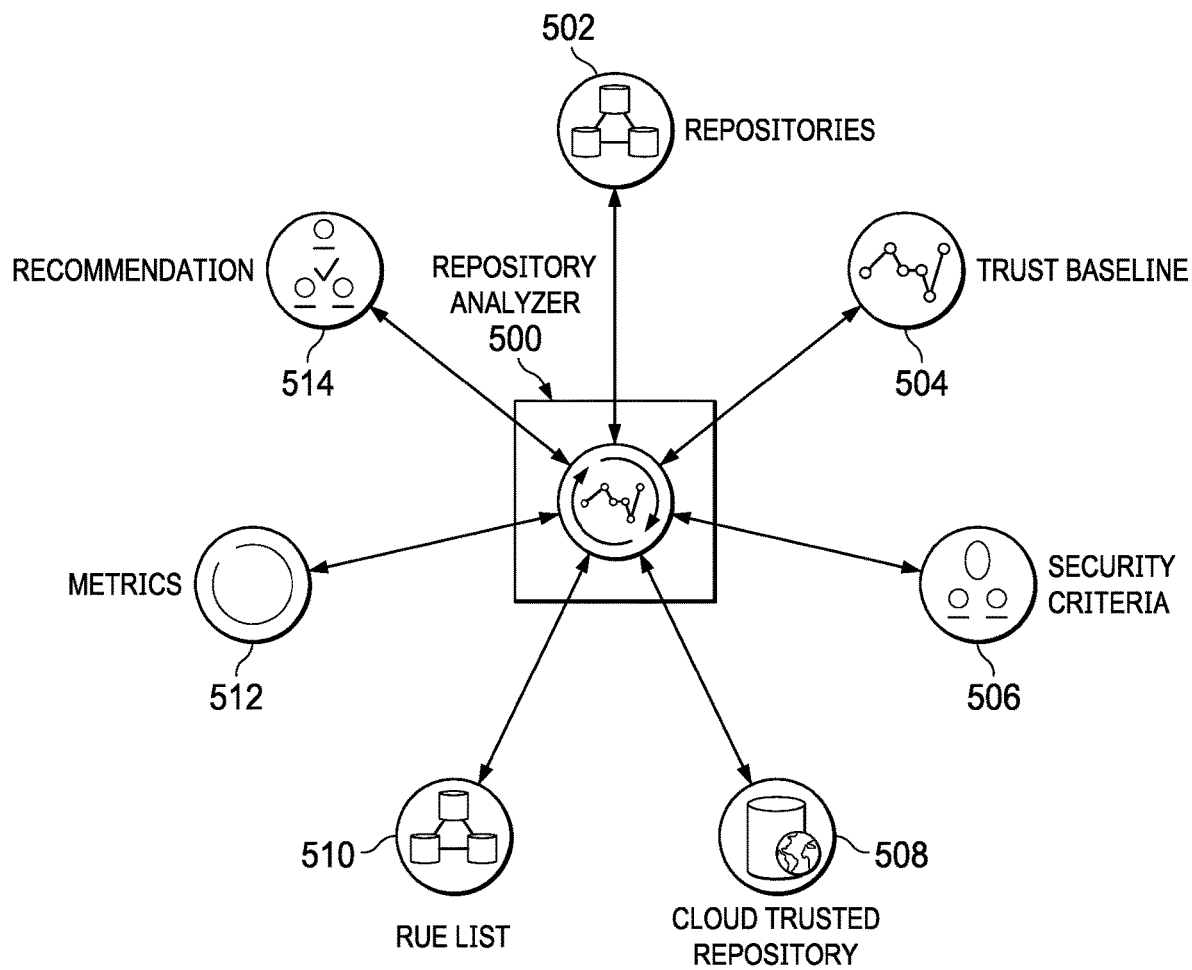
FIG. 5 is a diagram illustrating trust review in accordance with an illustrative embodiment.

In FIG. 5, a diagram illustrating trust review is depicted in accordance with an illustrative embodiment. As depicted, repository analyzer 500 can operate to evaluate repositories 502 to determine whether repositories 502 are trusted repositories. In this example, this review is performed automatically by repository analyzer 500 using trust baseline 504. In this illustrative example, trust baseline 504 can represent and define industry accepted repositories across security criteria 506. Trust baseline 504 can also represent repositories trusted by the organization.

As depicted, trust baseline 504 can be created by repository analyzer 500 using trusted repositories stored in cloud trusted repository 508 and security criteria 506. In this illustrative example, repository analyzer 500 can apply security criteria 506 to each trusted repository in cloud trusted repository list 508. The results of applying security criteria 506 to each trusted repository results in data being created for each trusted repository that can be converted into baseline metrics. These baseline metrics can form trust baseline 504.

Repository analyzer 500 uses repository under evaluation (RUE) list 510 to identify repositories 502 that are to be evaluated. Repository analyzer 500 applies security criteria 506 to a repository under review in repositories 502. This application results in data that can be processed to create metrics 512 for the repository under evaluation. In this illustrative example, a metric is created in metrics 512 for each criterion in security criteria 506. Metrics 512 can be compared to trust baseline 504. The results of this comparison can be compared to acceptance tolerances to determine whether the repository under review can be considered a trusted repository.

In response to this analysis, repository analyzer 500 generates recommendation 514. In this illustrative example, recommendation 514 can indicate whether the repository under review is a trusted repository. Recommendation 514 can be used by repository analyzer 500 or another software process to add the repository under review to cloud trusted repository 508 in response the recommendation indicating that the repository to review is a trust repository. This process can be performed automatically by repository analyzer 500 in response to repository under evaluation 510 being received without needing user input.

Figure 6:
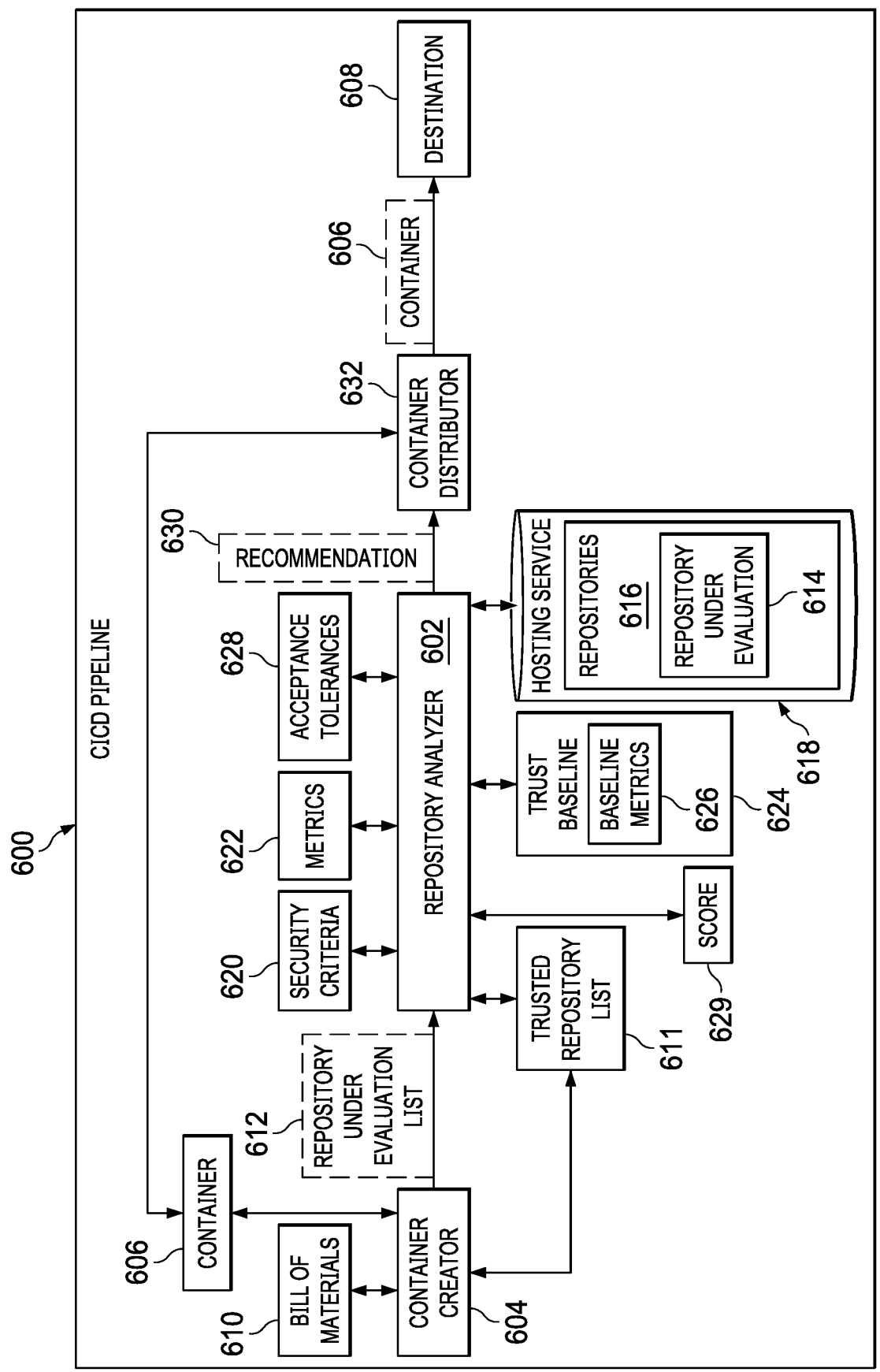
FIG. 6 is a block diagram of a continuous integration and continuous distribution pipeline in accordance with an illustrative embodiment.

With reference to FIG. 6, a block diagram of a continuous integration and continuous distribution pipeline is depicted in accordance with an illustrative embodiment. Continuous integration and continuous delivery (CICD) pipeline 600 is an example implementation for repository analyzer 602.

As depicted, container creator 604 creates containers such as container 606 in continuous integration and continuous delivery pipeline 600 for distribution to destination 608. Destination 608 can take a number of different forms depending on the particular implementation. For example, destination 608 can be a website for container publication. As another example, destination 608 can be a cloud for a customer. In other words, container 606 can contain an application created for a customer and sent to the cloud for use by the customer. In yet another example, destination 608 can be a server computer in a local area network.

In this illustrative example, container creator 604 identifies components within container 606 using bill of materials (BOM) 610 for container 606. Bill of materials 610 can identify where different software components, such as repositories, are pulled from to form container 606. Bill of materials 610 can be located in container 606 or in another location. In this illustrative example, container creator 604 can identify repositories that are in locations that are not designated as trusted repositories from trusted repository list 611. Container creator 604 can use this identification to create repository under evaluation list 612.

In response to receiving repository under evaluation list 612 from container creator 604, repository analyzer 602 can identify repository under evaluation 614 in repositories 616 stored by hosting service 618 from this list. Hosting service 618 can be, for example, in Internet hosting service for software development and version control. For example, hosting service 618 can be GitHub available from GitHub, Inc, Bitbucket available from Atlassian Corporation Plc, Azure DevOps services available from Microsoft Corporation, or other suitable hosting services.

In this illustrative example, repository analyzer 602 can make calls to hosting service 618 to obtain data for security criteria 620. These calls can be, for example, application programming interface calls supported by hosting service 618. This data can be used to create metrics 622.

Metrics 622 can be compared to trust baseline 624. In this example, metrics 622 can be compared to baseline metrics 626 in trust baseline 624. Acceptance tolerances 628 can be used to determine whether these metrics 622 have acceptable values when compared to baseline metrics 626. This comparison of the metrics can be used to determine score 629. For example, score 629 can identify how many of metrics 622 meet acceptance tolerances 628 for security criteria 620 when compared to baseline metrics 626.

In this illustrative example, acceptance tolerances 628 can be used to determine whether score 629 has such that repository under evaluation 614 can be considered a trusted repository. If repository under evaluation 614 is considered a trusted repository, this repository can be added to trusted repository list 611. In this illustrative example, repository analyzer 602 generates recommendation 630 for repository under evaluation 614. Recommendation 630 is sent by repository analyzer 602 to container distributor 632.

In this illustrative example, recommendation 630 can indicate whether all of the repositories in repository under evaluation list 612 generated for container 606 are considered trusted repositories. If all of the repositories are considered trusted, then container distributor in 632 sends container 606 to destination 608. In another illustrative example, recommendation 630 can indicate whether container 606 can be distributed to destination 608.

In this illustrative example, repository analyzer 602 is a component within continuous integration and continuous delivery pipeline 600 that generates recommendations a manner that enables an automated pop pipeline. In the illustrative example, manual reviews of repositories not on trusted repository lists are unnecessary in the illustrative examples. Further, the use of repository analyzer 602 to identify whether repositories in a container are trusted repositories can be performed in real time and in a manner that reflects the security policy of the organization generating and distributing containers using continuous integration and continuous delivery pipeline 600.

Figure 7:
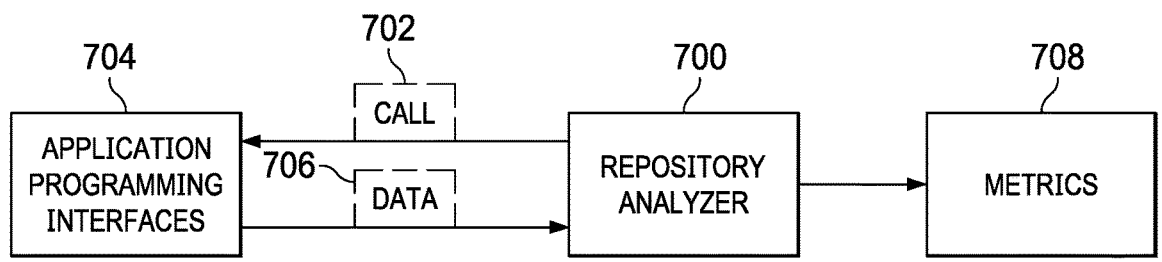
FIG. 7 is an illustration of dataflow in applying security criteria to a repository under review in accordance with an illustrative embodiment.

With reference next to FIG. 7, an illustration of dataflow in applying security criteria to a repository under review is depicted in accordance with an illustrative embodiment. In this illustrative example, repository analyzer 700 can make call 702 to application programming interfaces 704.

In response to call 702, data 706 is returned to repository analyzer 700 by application programming interfaces 704. In this illustrative example, application programming interfaces 704 can apply security criteria to the repository under review referenced in call 702. Application programming interfaces 704 can be located in a depository management system that manages the repository under evaluation.

In response to the application of the security criteria, application programming interfaces 704 returns data 706 to repository analyzer 700. With the use of application programming interfaces 704, the same data can be returned for data 706 performing trust reviews for different repositories under evaluation. As result, subjective news in manual reviews can be reduced through this type of data retrieval of data 706.

Repository analyzer 700 generates metrics 708 from data 706. Metrics 708 can be values created from data 706. Metrics 708 can be selected from at last one of a binary value, a text descriptor, a percentage, a number, string, or some other type of type of value.

As another, data 706 may be returned from a branch API in application programming interfaces 704. The branch metric in metrics 708 may be a value such as a binary value such as "true" or "false" or "1" or "0". Data 706 may provide a list of branches that branch protection rather than providing a binary value that whether branch protection is present. If branches are listed, then branch protection is present and repository analyzer 700 sets the branch metric equal to "true". On the other hand, if branches are not listed in data 706, then branch protection is not present and repository analyzer 700 sets the branch metric equal to "false".

A metric identified for a security criterion for a repository under review can indicate where the repository under evaluation stands relative to the set of trusted repositories for that security criteria. For example, the score can be 145 which is a value metric for a security criterion. A comparison in this value for the metric with the scores for metrics for trusted repositories can indicate that the repository under evaluation is better than 85% of the trusted repositories for the particular security criteria.

Figure 8:
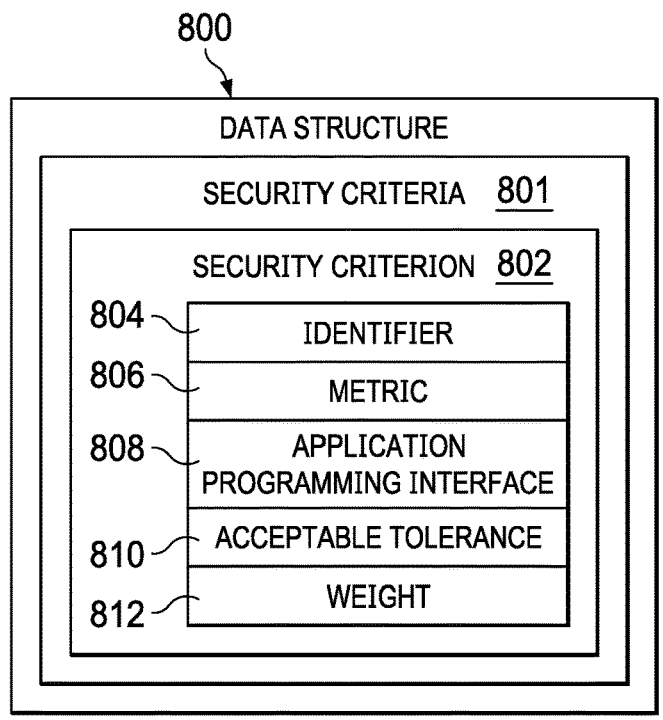
FIG. 8 is an illustration of a data structure containing security criteria in accordance with an illustrative embodiment.

With reference next to FIG. 8, an illustration of a data structure containing security criteria is depicted in accordance with an illustrative embodiment. In this illustrative example, 800 is an example of an implementation for data structure 414 in FIG. 4.

As depicted, data structure 800 comprises a number of different components for each criterion in security criteria 801. For example, security criterion 802 in security criteria 801 is defined by identifier 804, metric 806, application programming interface 808, acceptance tolerances 810, and weight 812.

As depicted, identifier 804 is a name or other type of identifier for security criterion 802. For example, identifier 804 can be trusted owner, branch protection, languages, commit activity, or some other suitable type of identifier.

Metric 806 identifies the metric for security criterion 802. For example, metric 806 a trusted owner can be a Boolean value indicating whether the owner of the repository owns at least one of the repositories in a trust repository list. As another example, when metric 806 is for branch protection, the metric can be a Boolean indicating whether any of the branches are protected for the repository under review.

Application programming interface (API) 808 identifies the application programming interface call that can be made to obtain data that can be used to determine metric 806. Application programming interface 808 can be a call made to the listing service that hosts the repository under evaluation.

In this illustrative example, acceptance tolerance 810 defines when metric 806 has a value that meets the security policy from which security criterion 802 is derived. For example, if metric 806 is percentage of code written in a language that can be scan has a value of 95% and acceptance tolerance 810 is 90 percent, then metric 806 is considered acceptable as being within a desired value for security criterion 802 as defined by acceptance tolerance 810. As result, security criterion 802 can be added to the score for the repository under evaluation. In another example, metric 806 is a Boolean value, acceptance tolerance 810 can indicate the desired Boolean value that metric 806 to be added to the score for the repository under evaluation.

Weight 812 indicates the weight to be given to metric 806 in generating a score for the repository under evaluation. For example, a weight of 1 means that the metric can be given a value of one comparison of the metric indicates that the metric meets security criterion 802 as identified by identifier 804. For example, if the Boolean value for metric 806 is true for trusted owner and weight 812 is 2, then a value of 2 is added to the score for the repository under evaluation.

With reference now to FIG. 9, an illustration of a data structure in the form of a JavaScript object notation data structure is depicted in accordance with an illustrative embodiment. In this illustrative example, JavaScript object notation data structure 900 is an example of an implementation for data structure 414 in FIG. 4 and data structure 800 in FIG. 8.

In this illustrative example, JavaScript object notation data structure 900 contains information for six security criteria. As depicted, the security criteria in this example comprises trusted owner 902, branch protection 904, languages 906, and commit activity 908. Additionally, JavaScript object notation data structure 900 also comprises passing limit 910, which is an example of acceptance tolerance for the score that a repository under review obtains. In this example, passing limit 910 is 80. This means that the repository under review should have a score that is greater than 80 percent to be considered a trusted repository.

As depicted, trusted owner 902 is a security criterion in which the repository should be owned by a user that has at least one repository on a trusted repository list to increase the confidence in the repository under review. In this example, metric 912 is a Boolean value as to whether the owner of the repository under evaluation has at least one repository in a trusted repository list. API 914 identifies the API call that is used to obtain information needed to determine metric 912. In this example, this and the other API calls are made to the hosting service in which the repository under evaluation is located.

Weight 916 identifies the waiting for metric 912. In this example, weight 916 has a value of one. As result, if the metric is true then a value of one is added to the score for the repository under review.

Next, branch protection 904 is a security criterion to determine whether branch protections present for the repository under review. Metric 918 defines that the branch protection has a Boolean value as to whether at least one of the branches for the repository under evaluation is branch protected. Branch protection enables a security policy to prevent accidental branch deletions, enforce code reviews, and require successful automated checks before pull requests can be merged.

In this illustrative example, API 920 represents an API call that can be made to obtain a list of branches that are protected. Weight 922 identifies the waiting to be given to this metric. As depicted, weight 922 has a value of 1.

Languages 906 is a security criterion with respect to how many languages are covered by code scanners. In this security criterion, metric 924 identifies the percentage of code in the repository under evaluation that is written in a language that can be seen.

Tolerance 928 is an acceptance tolerance that identifies the percentage of languages 906 needed for this metric to pass. In this example, tolerance 928 as a value of 90. Tolerance this acceptance tolerance can be selected based on the percentages present for trusted repositories in a trust baseline. As depicted, weight on 30 is a weight for metric 924. In this depicted example, weight 930 is 1.

In this illustrative example, commit activity 908 is a security criterion for commit operations by contributors sending changes to source code to a repository made within the past year. As depicted, metric 932 is the total commits that occurred in the past year.

As depicted, API 934 identifies the API call that can be used to obtain the data for commit activity that is used to determine the commit activity in the past year. As depicted, percentile tolerance 936 is an acceptance tolerance identifying percentage of accepted software contributions aka commits as compared to the average number of commits in trusted repositories. When a member of the open source community contributes code, e.g. bug fixes or feature enhancements, into the repo, it is registered a commit. In this example, the percentage tolerance is 25%.

In the illustrative example, percentile tolerance 936 can be used to compare numeric values in a metric to the corresponding baseline metrics. For example, assume 100 repositories are in the trusted set of repositories and the metric of interest can be the number of commits. The value for the number of commits value of the repository under evaluation to the values for the number of commits of the trusted set of repositories. If value for the number of commits of the repository under evaluation is larger than exactly 25% of the values for the number of commits in the trusted set of repositories value for the number of commits value of the repository under evaluation, then percentile tolerance 936 is 25%. If value of the number of commits for the repository under evaluation is larger than exactly 50% (this would be the median) of the values for the number of commits for the set of trusted repositories, then percentile tolerance 936 is 50%. In the illustrative example, increasing the number for percentile tolerance 936 can means that the metric value is better than a larger proportion of the trusted set of trusted repositories. If percentile tolerance 926 is set to 25%, the number of commits to the repository under evaluation is required have a value that is better than at least one quarter of the trusted set trusted set of repositories.

In this example, weight 938 has a value of 1. The number of commits into a repo reflects and activity, involvement and support the repo has from the open source community. If the open source community is actively using the code base, identifying and fixing bugs or integrating new features into the code base via commits, it provides a metric on the health and sustainability of the code in the repo as well as the health of the community supporting the code. Open source project rarely announce end-of-life for their software. Repos below the tolerance level indicates that the code base is stale, that the community has abandon support and effectively brought the software to end-of-life.

Illustration of the security criteria in JavaScript object notation data structure 900 is not meant to limit the manner in which other data structures can be implemented. For example, other types of data structures can be used in place of JavaScript object notation data structure. For example, a table, a linked list, the text file, an extensible markup language object, or other suitable type of data structures used.

As another example, 6 security criteria are depicted as examples of different types of security criteria that can be used. This number is not meant to limit the number security criteria that can be used in other data structures. For example, 11 security criteria, 22 security criteria, 60 security criteria, or some other number of site purity criteria can be used in other implementations.

Figure 10:
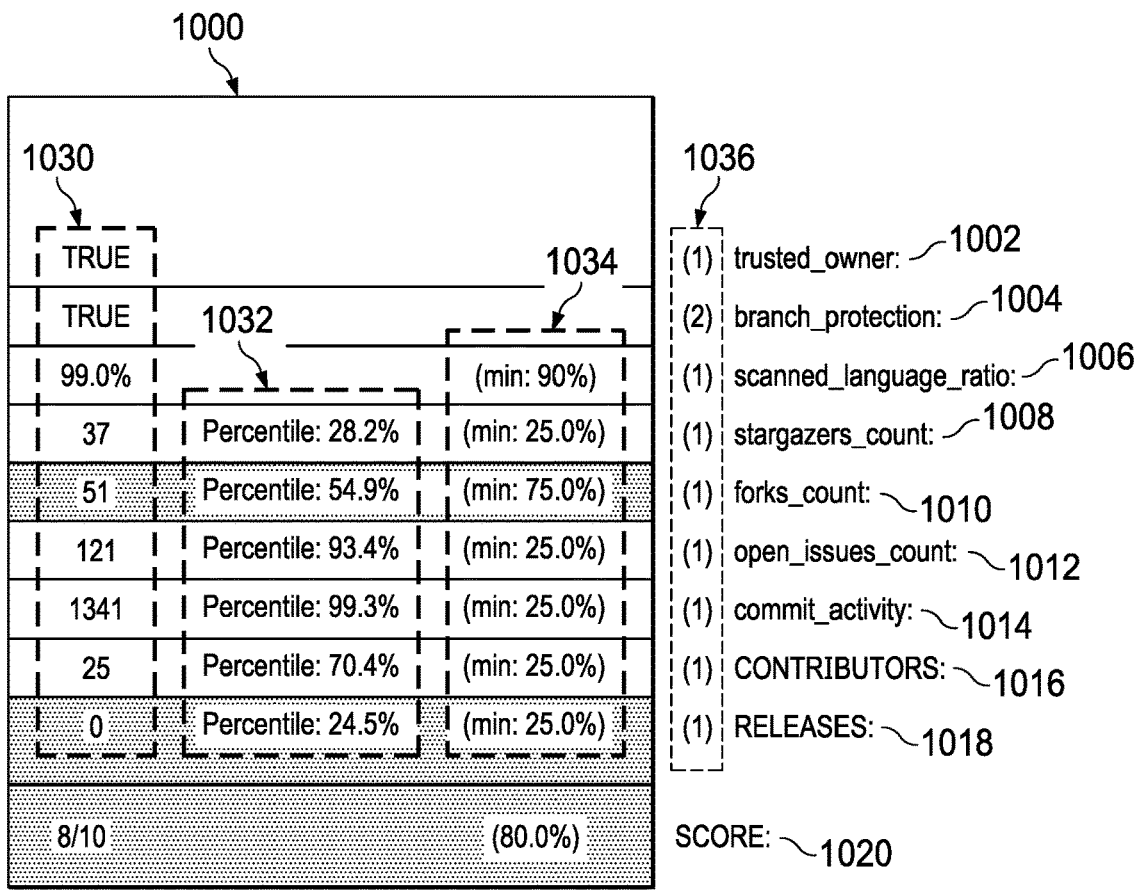
FIG. 10 is an illustration of metrics from a trust review for a repository under evaluation in accordance with an illustrative embodiment.

Turning next to FIG. 10, an illustration of metrics from a trust review for a repository under evaluation is depicted in accordance with an illustrative embodiment. In this illustrative example, metrics results can be results returned from a trust review performed by a trust analyzer.

As depicted, results 1000 are for security criteria comprising trusted owner 1002, branch_protection 1004, scanned_language_ratio 1006, stargazer count 1008, forks_count 1010, open_issues_count 1012, comitt_activity 1014, contributors 1016, and releases 1018. Additionally, results 1000 also include score 1020.

In this illustrative example, section 1030 are values generated from data returned by API calls made to the hosting service for the repository under review. In section 1030. Boolean values are present for trusted_owner 1002 and branch_protection 1004.

In section 1032, a percentage is determined for scanned_language_ratio 1006 in section 1030. Additionally, values for, stargazer_count 1008, forks_count 1010, open_issues_count 1012, comitt_activity 1014, contributors 1016, and releases 1018. These percentages are based on comparison of the values for these metrics with the values in the trust baseline. These percentages indicate where these particular metrics fall with respect to the corresponding metrics for trusted repositories.

In this example, section 1034 identifies acceptance tolerances for the following metrics: scanned_language_ratio 1006, stargazer_count 1008, forks_count 1010, open_issues_count 1012, comitt_activity 1014, contributors 1016, and releases 1018. Additionally, section 1030 also identifies acceptance tolerance for score 1020. In this illustrative example, acceptance tolerances not defined for trusted_owner 1002, branch_protection 1004 because these metrics have Boolean values such as true or false.

In this illustrative example, score 1020 is 8/10 for 80%. In illustrative example, forks_count 1010 and releases 1018 have percentages that did not meet the acceptance tolerances. As result, these metrics were not added score 1020. Although only 9 metrics are present in this example, a possible score of 10 is present because of weighting in section 1036. As depicted, the weight for 8 of the 10 metrics is 1 while the weight for branch_protection 1004 is 2.

Figure 11:
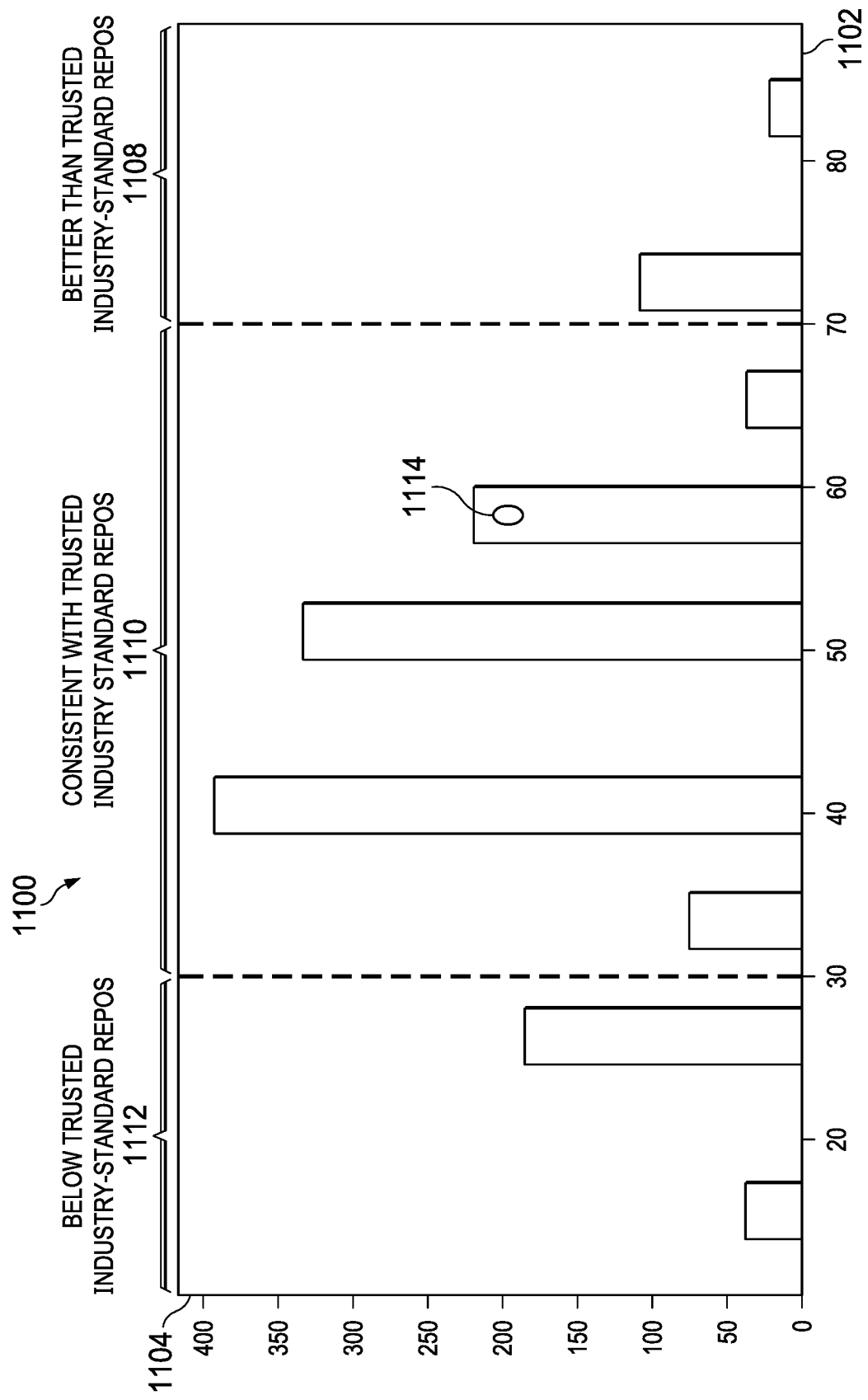
FIG. 11 is an illustration of security criterion in a trust baseline in accordance with an illustrative embodiment.

With reference now to FIG. 11, an illustration of security criterion in a trust baseline is depicted in accordance with an illustrative embodiment. Trust baseline 1100 is a visualization of a trust metric for a security criterion in a trust baseline, such as trust baseline 424 in FIG. 4, trust baseline 504 in FIG. 5 and trust baseline 624 in FIG. 6.

In this illustrative example, trust baseline 1100 is depicted in the form of a histogram for a single security criterion. As depicted, x-axis 1102 represents the possible values for the security criterion. The security criterion can be, for example, number contributors, number of documents, or some other suitable security criterion. Y-axis 1104 represents the number of repositories that have the value on x-axis 1102.

As depicted, trust baseline 1100 has three sections characterizing the scores for the security criterion. Sections are better than trusted industry-standard repos 1108, consistent with trusted industry-standard repos 1110, and below trusted industry-standard repos 1112.

As depicted, point 1114 as a value of 58 for the security criterion. In this example, point 1114 falls within consistent with trusted industry-standard repo 1110. Further, the comparison can also provide a percentage of where the score of 58 falls with respect to other trusted repositories for this security criterion.

Other baseline metrics can be present for other security criteria in addition to the one depicted in trust baseline 1100. Illustration of trust baseline 1100 is provided as an example of one manner in which metrics can be organized within a trust baseline. This illustration is not meant to limit the manner in which other trust baselines can be structured. For example, a trust baseline can be organized with multivariate relationships between different metrics.

For example, with a bivariate more subtle anomalies can be identified between metrics. With a bivariate example, data can be examined between commit activity and open issues. Analysis of data for these two metrics may reveal that it is typical for a repository to have high commit activity and a high number of open issues at the same time. Additionally, it is also normal to have a low commit activity and a low number of open issues at the same time. However, having many open issues and low commit activity is not considered normal in this example.

With this relationship, analyzing these metrics separately may not reveal the third case in which having many open issues in a low commit activity is abnormal. A bivariate analysis in this example enables identifying this type of anomaly. This type of analysis may be made for three, four, or more metrics.

Turning next to FIG. 12, a flowchart of a process for performing a trust review is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in at least one of in repository analyzer 408 in computer system 406 in FIG. 4, repository analyzer 500 in FIG. 5; repository analyzer 602 in in FIG. 6, and repository analyzer 700 in in FIG. 7.

The process begins by identifying security criteria for the trust review (step 1200). The process applies the security criteria on a repository under evaluation (step 1202).

The process determines a recommendation for the repository under evaluation using a comparison of a result of applying the security criteria on the repository under evaluation to a trust baseline for a set of trusted repositories (step 1204). The process performs a set of actions based on the recommendation (step 1206). The process terminates thereafter.

With reference to FIG. 13, a flowchart of a process for performing an action in response to a recommendation in response to a trust review is depicted in accordance with an illustrative embodiment. The process illustrated in FIG. 13 is an example of an implementation for step 1206 in FIG. 12.

The process adds the repository under evaluation to the set of trusted repositories in response to the recommendation indicating that the repository under evaluation is a trusted repository (step 1300). The process terminates thereafter. In step 1300, the repository under evaluation can be added to the set of trusted repositories in a number of different ways. For example, the repository under evaluation can be added the set of trusted repositories by at least one of adding the repository under evaluation to a trust repository list, placed in same location as the set of trusted repositories, or some other suitable action.

With next reference to FIG. 14, a flowchart of a process for performing an action in response to a recommendation in response to a trust review is depicted in accordance with an illustrative embodiment. The process illustrated in FIG. 14 is an example of an implementation for step 1206 in FIG. 12.

The process removed the repository under evaluation from the set of trusted repositories in response to the recommendation indicating that the repository under evaluation is no longer the trusted repository (step 1400). The process terminates thereafter.

Figure 15:
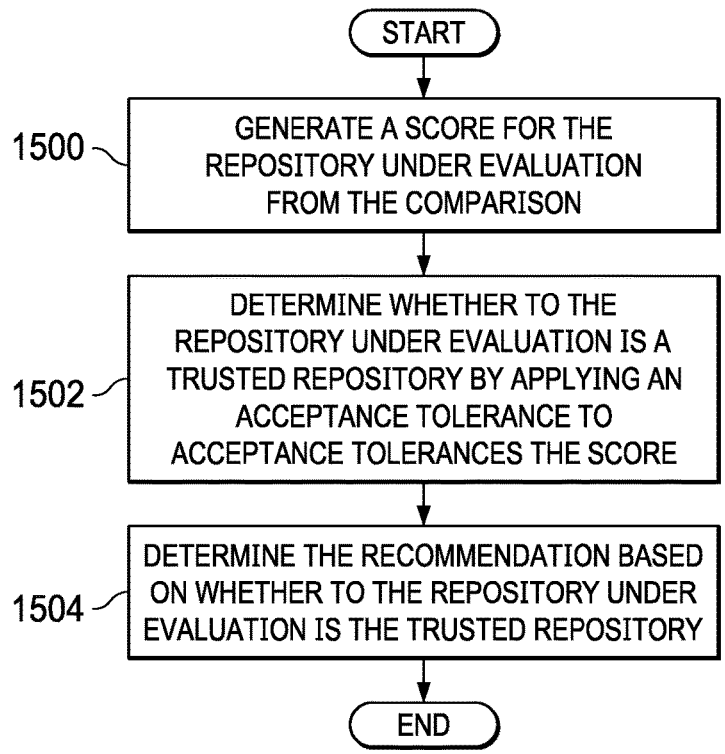
FIG. 15 is flowchart of a process for determining a recommendation for a repository under evaluation in accordance with an illustrative embodiment.

Turning to FIG. 15, a flowchart of a process for determining a recommendation for a repository under evaluation is depicted in accordance with an illustrative embodiment. The process illustrated in FIG. 4 is an example one implementation for step 1204 in FIG. 12.

The process begins by generating a score for the repository under evaluation from the comparison (step 1500). In step 1500, a score is number of security criteria met by the comparison of the metrics generated for a repository under evaluation with the trust baseline. For example, if a security criterion is trusted owner and the metric is true, then this value is added to the score for the repository.

The process determines whether to the repository under evaluation is a trusted repository by applying an acceptance tolerance to acceptance tolerances the score (step 1502). The acceptance tolerance can be used to determine what score can be score is needed to accept the repository under evaluation as a trusted repository. For example, if 8 of the 10 metrics fall within the acceptance tolerances, then a score of eight out of 10 or 80 percent is present for the repository under review. If the acceptance tolerance for the score is 90%, the repository under evaluation is not accepted. If the acceptance tolerance is 78%, then the repository under evaluation is accepted as a trusted repository. This example only describes the use of a single security criteria for purposes of determining whether a repository under evaluation is a trust repository under evaluation. In evaluating repositories under evaluation, this process can be performed for multiple security criteria.

The process determines the recommendation based on whether to the repository under evaluation is the trusted repository (step 1504). The process terminates thereafter.

Figure 16:
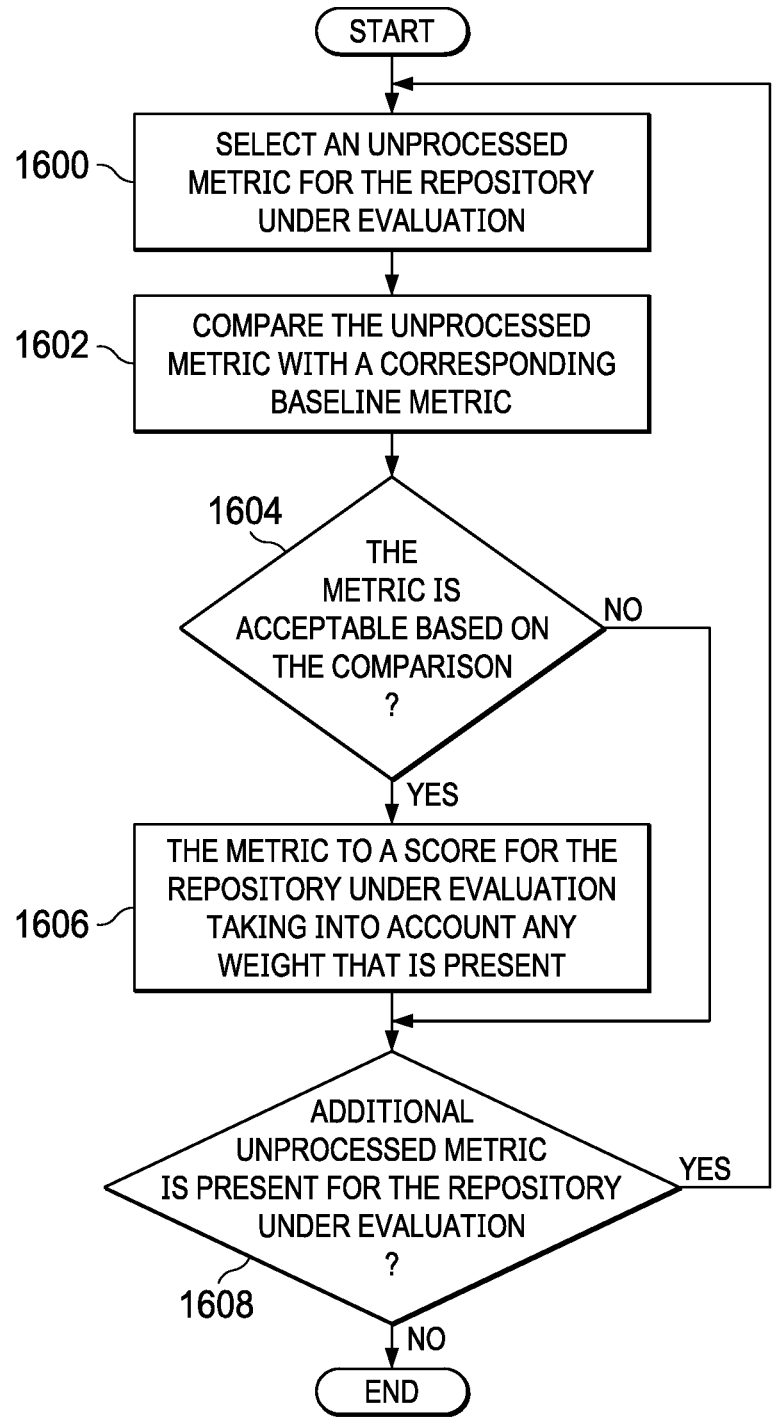
FIG. 16 is a flowchart of a process for generating a score for repository under evaluation in accordance with an illustrative embodiment.

Turning next to FIG. 16, a flowchart of a process for generating a score for repository under evaluation is depicted in accordance with an illustrative embodiment. The process illustrated in this figure is an example one implementation for step 1500 in FIG. 15.

The process begins by selecting an unprocessed metric for the repository under evaluation (step 1600). The process compares the unprocessed metric with a corresponding baseline metric (step 1602). In this example, both metrics are for the same security criteria.

The process determines whether the metric is acceptable based on the comparison (step 1604). In response the metric being acceptable, the process adds the metric to a score for the repository under evaluation taking into account any weight that is present (step 1606).

A determination is made as to whether an additional unprocessed metric is present for the repository under evaluation (step 1608). If another unprocessed metric is present, process returns to step 1600. Otherwise, the process terminates. With reference again to step 1604, if the metric is not acceptable, the process proceeds to step 1608 as described above.

Figure 17:
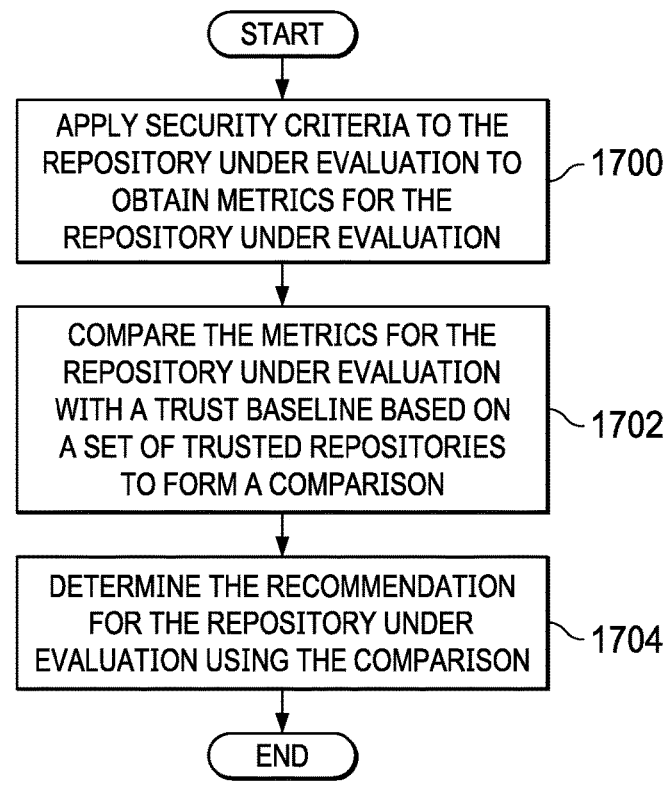
FIG. 17 is a flowchart of a process for performing a trust review in accordance with an illustrative embodiment.

FIG. 17, a flowchart of a process for performing a trust review is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in at least one of in repository analyzer 408 in computer system 406 in FIG. 4, repository analyzer 500 in FIG. 5; repository analyzer 602 in in FIG. 6, and repository analyzer 700 in in FIG. 7.

The process beings by applying security criteria to the repository under evaluation to obtain metrics for the repository under evaluation (step 1700). The process compares the metrics for the repository under evaluation with a trust baseline based on a set of trusted repositories to form a comparison (step 1702).

The process determines the recommendation for the repository under evaluation using the comparison (step 1704). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 18:
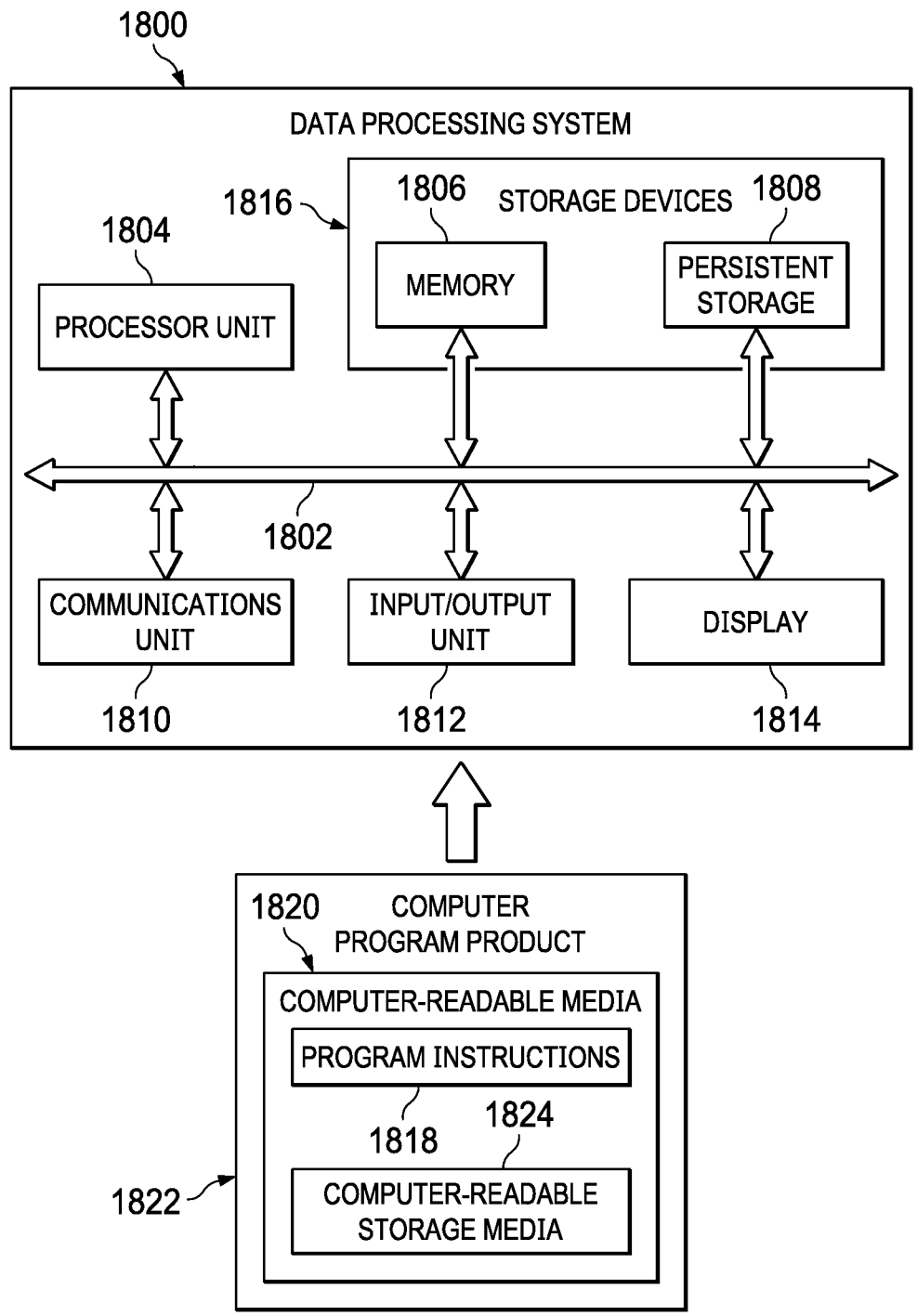
FIG. 18 is a block diagram of a data processing system in accordance with an illustrative embodiment.

Turning now to FIG. 18, a block diagram of a data processing system is depicted in accordance with an illustrative embodiment. Data processing system 1800 can also be used to implement cloud computing nodes 10, personal digital assistant (PDA) or cellular telephone 54A, desktop computer 54B, laptop computer 54C, automobile computer system 54N in FIG. 1, computing systems in hardware and software layer 60 in FIG. 2, server computer 304 in FIG. 3, server computer 306 in FIG. 3, client devices 310 in FIG. 3, and computer system 406 in FIG. 4. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can may be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, can be, for example, a random-access memory or any other suitable volatile or non-volatile storage device. Persistent storage 1808 may take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which may be located in a memory, such as memory 1806.

These instructions are referred to as program instructions, computer usable program instructions, or computer-readable program instructions in which the instructions are in a form that can be read and executed by a processor in processor unit 1804. The program instructions in the different embodiments can be embodied on different physical or computer-readable storage media, such as memory 1806 or persistent storage 1808.

Program instructions 1818 is located in a functional form on computer-readable media 1820 that is selectively removable and can be loaded onto or transferred to data processing system 1800 for execution by processor unit 1804. Program instructions 1818 and computer-readable media 1820 form computer program product 1822 in these illustrative examples. In the illustrative example, computer-readable media 1820 is computer-readable storage media 1824.

Computer-readable storage media 1824 is a physical or tangible storage device used to store program instructions 1818 rather than a medium that propagates or transmits program instructions 1818. Computer readable storage media 1824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1818 can be transferred to data processing system 1800 using a computer-readable signal media. The computer-readable signal media are signals and can be, for example, a propagated data signal containing program instructions 1818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1820" can be singular or plural. For example, program instructions 1818 can be located in computer-readable media 1820 in the form of a single storage device or system. In another example, program instructions 1818 can be located in computer-readable media 1820 that is distributed in multiple data processing systems. In other words, some instructions in program instructions 1818 can be located in one data processing system while other instructions in program instructions 1818 can be located in one data processing system. For example, a portion of program instructions 1818 can be located in computer-readable media 1820 in a server computer while another portion of program instructions 1818 can be located in computer-readable media 1820 located in a set of client computers.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, may be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program instructions 1818.

Thus, illustrative embodiments of the present invention provide a computer implemented method, computer system, and computer program product for performing a trust review of repositories is provided. A computer system identifies security criteria for the trust review. The computer system applies the security criteria on a repository under evaluation. The computer system determines a recommendation for the repository under evaluation using a comparison of a result of applying the security criteria on the repository under evaluation to a trust baseline for a set of trusted repositories. According to other illustrative embodiments, a trust system and a computer program product for performing a trust review are provided.

In the illustrative examples, security criteria can be identified from a source such as a data structure or other source. This security criteria can be applied to a repository under evaluation. Data received from the application of the security criteria can be used to determine metrics for the repository under evaluation. These metrics can be compared to a baseline for a set of trusted repositories. This comparison can be used to determine whether the repository under evaluation is interested repository. And number of different actions can be performed such as adding the repository under evaluation to a list of trusted repositories, distributing software using the repository under review that has been identified as a trust repository, or other suitable actions.

The analysis of the repository and reviewed using security criteria and trust baselines can reduce the subjectiveness present with current techniques for evaluating repositories. Further, one or more illustrative examples enable dynamically applying security criteria in determining a rating of the repository under review as compared to the other security criteria. In the illustrative examples, this rating can be a percentage identified for the repository under review with respect to trust repositories for each criterion in the criteria that are considered in the trust review. In this manner, the illustrative examples provide a data-driven approach to perform trust reviews of repositories. Illustrative examples automate the measurement of metrics for security criteria in analyzing the trustworthiness of a repository under review using the metrics.

As a result, subjectiveness of manual reviews can be reduced or eliminated. In illustrative example, the use of interfaces such as application programming interfaces can ensure that the same data is evaluated for all repositories under evaluation as well as applying the security criteria to trusted repositories to form a trust baseline.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for performing a trust review of repositories, the method comprising:
    identifying, by a computer system, security criteria for the trust review;
    applying, by the computer system, the security criteria on a repository under evaluation, wherein the repository under evaluation is used to form a software container;
    determining in real time, by the computer system, a recommendation for the repository under evaluation using a comparison of a result of applying the security criteria on the repository under evaluation to a trust baseline for a set of trusted repositories, wherein determining the recommendation for the repository under evaluation comprises:
    generating, by the computer system, a set of scores for the repository under evaluation by comparing results of application of the security criteria to the repository under evaluation to a trusted baseline for a set of trusted repositories;
    determining, by the computer system, whether the repository under evaluation is a trusted repository by applying an acceptance tolerance to the score;
    determining, by the computer system, a recommendation for the repository under evaluation based on whether the repository under evaluation is a trusted repository; and
    responsive to a determination that the repository under evaluation is a trusted repository, distributing, by the computer system, the software container to a destination in a cloud environment.

2. The method of claim 1 further comprising:
    adding, by the computer system, the repository under evaluation to the set of trusted repositories in response to the recommendation indicating that the repository under evaluation is a trusted repository.

3. The method of claim 1, wherein the repository under evaluation is a trusted repository in the set of trusted repositories and further comprising:
    removing, by the computer system, the repository under evaluation from the set of trusted repositories in response to the recommendation indicating that the repository under evaluation is no longer the trusted repository.

4. The method of claim 1, wherein applying the security criteria to the set of trusted repositories to create the trust baseline comprises:
    applying, by the computer system, the security criteria to the set of trusted repositories to obtain baseline metrics for the set of trusted repositories; and
    creating, by the computer system, the trust baseline for the set of trusted repositories using the baseline metrics for the set of trusted repositories.

5. The method of claim 1, wherein the recommendation comprises at least one of a rating of the repository under evaluation relative to the set of trusted repositories, an indication of whether the repository under review is a trusted repository, an action, or a categorization of the repository under evaluation under an industry standard.

6. The method of claim 1, wherein the recommendation is further based on a security policy defining a set of acceptance tolerances.

7. The method of claim 1, wherein the security criteria is located in a JavaScript object notation data structure defining how measure the security criteria and a priority for each of the security criteria relative to other security criteria.

8. The method of claim 1, wherein the accepted tolerance defines how many of a number of metrics for the security criteria need to meet a threshold in a trust baseline for the repository under evaluation to be considered a trusted repository.

9. A method for analyzing a repository under evaluation, the method comprising:
    applying, by a computer system, security criteria to the repository under evaluation to obtain metrics for the repository under evaluation, wherein the repository under evaluation is used to form a software container;
    comparing, by the computer system, the metrics for the repository under evaluation with a trust baseline based on a set of trusted repositories to form a comparison;
    determining in real time, by the computer system, a recommendation for the repository under evaluation using the comparison, wherein determining the recommendation or the repository under evaluation comprises:
    generating, by the computer system, a set of scores for the repository under evaluation from the comparison;
    determining, by the computer system, whether the repository under evaluation is a trusted repository using by applying an acceptance tolerance to the score;
    determining a recommendation for the repository under evaluation based on whether the repository under evaluation is a trusted repository; and
    responsive to a determination that the repository under evaluation is a trusted repository, distributing the software container to a destination.

10. The method of claim 9 further comprising:
applying, by the computer system, the security criteria to the set of trusted repositories to obtain baseline metrics; and
creating the trust baseline using the baseline metrics.

11. The method of claim 9, wherein the security criteria is located in a data structure defining how measure the security criteria and at least one of a priority for each of the security criteria relative to other security criteria.

12. The method of claim 9, wherein the accepted tolerance defines how many of a number of metrics for the security criteria need to meet a threshold in a trust baseline for the repository under evaluation to be considered a trusted repository.

13. A trust review system for performing a trust review of repositories, the trust review system comprising:
a computer system, wherein the computer system executes program instructions to:
identify security criteria for the trust review;
apply the security criteria on a repository under evaluation in the repositories, wherein the repository under evaluation is used to form a software container;
determine in real time a recommendation for the repository under evaluation using a comparison of a result of applying the security criteria on the repository under evaluation to a trust baseline for a set of trusted repositories, wherein determining the recommendation for the repository under evaluation comprises:
generate a set of scores for the repository under evaluation by comparing results of application of the security criteria to the repository under evaluation to a trusted baseline for a set of trusted repositories;
determine whether to the repository under evaluation is a trusted repository by applying an acceptance tolerance to the score;
determine a recommendation for the repository under evaluation based on whether the repository under evaluation is a trusted repository; and
responsive to a determination that the repository under evaluation is a trusted repository, distribute, by the computer system, the software container to a destination in a cloud environment.

14. The trust review system of claim 13, wherein the computer system executes the program instructions to:
add the repository under evaluation to the set of trusted repositories in response to the recommendation indicating that the repository under evaluation is a trusted repository.

15. The trust review system of claim 13, wherein the repository under evaluation is a trusted repository in the set of trusted repositories and, wherein the computer system executes the program instructions to:
remove the repository under evaluation from the set of trusted repositories in response to the recommendation indicating that the repository under evaluation is no longer the trusted repository.

16. The trust review system of claim 13, wherein the computer system executes the program instructions to:
apply the security criteria to the set of trusted repositories to obtain baseline metrics for the set of trusted repositories; and
create the trust baseline for the set of trusted repositories using the baseline metrics for the set of trusted repositories.

17. The trust review system of claim 13, wherein the recommendation comprises at least one of a rating of the repository under evaluation relative to the set of trusted repositories, an indication of whether the repository under review is a trusted repository, an action, or a categorization of the repository under evaluation under an industry standard.

18. The trust review system of claim 13, wherein the result is further based on a security policy defining an acceptance tolerance.

19. The trust review system of claim 13, wherein the security criteria is located in a JavaScript object notation data structure defining how measure the security criteria and a priority for each of the security criteria relative to other security criteria.

20. The trust review system of claim 13, wherein the accepted tolerance defines how many of a number of metrics for the security criteria need to meet a threshold in a trust baseline for the repository under evaluation to be considered a trusted repository.

21. A trust review system for analyzing a repository under evaluation, the trust review system comprising:
a computer system, wherein the computer system executes program instructions to:
apply security criteria to the repository under evaluation to obtain a set of metrics for the repository under evaluation, wherein the repository under evaluation is used to form a software container;
compare the set of metrics for the repository under evaluation with a trust baseline based on a set of trusted repositories to form a comparison;
determine in real-time a recommendation for the repository under evaluation using the comparison, wherein determining the recommendation for the repository under evaluation comprises:
generate a set of scores for the repository under evaluation from the comparison;
determine whether to the repository under evaluation is a trusted repository using by applying an acceptance tolerance to the score;
determine a recommendation for the repository under evaluation based on whether the repository under evaluation is a trusted repository; and
responsive to a determination that the repository under evaluation is a trusted repository, distribute, by the computer system, the software container to a destination in a cloud environment.

22. The trust review system of claim 21, wherein the computer system executes program instructions to:
apply, by the computer system, the security criteria to the set of trusted repositories to obtain baseline metrics; and
create the trust baseline using the baseline metrics.

23. The trust review system of claim 21, wherein the accepted tolerance defines how many of a number of metrics for the security criteria need to meet a threshold in a trust baseline for the repository under evaluation to be considered a trusted repository.

24. A computer program product for performing a trust review of repositories, the computer program product comprising a computer readable storage medium having program instructions embodied therewith, the program instructions executable by a computer system to cause the computer system to perform a method of:
identifying, by the computer system, security criteria for the trust review;
applying, by the computer system, the security criteria on a repository under evaluation in the repositories, wherein the repository under evaluation is used to form a software container;

determining in real-time, by the computer system, a recommendation for the repository under evaluation using a comparison of a result of applying the security criteria on the repository under evaluation to a trust baseline for a set of trusted repositories, wherein determining the recommendation for the repository under evaluation comprises:
- generate a set of scores for the repository under evaluation by comparing results of application of the security criteria to the repository under evaluation to a trusted baseline for a set of trusted repositories;
- determine whether to the repository under evaluation is a trusted repository using by applying an acceptance tolerance to the score;
- determine a recommendation for the repository under evaluation based on whether the repository under evaluation is a trusted repository; and responsive to a determination that the repository under evaluation is a trusted repository, distribute the software container to a destination.

25. A computer program product for analyzing a repository under evaluation, the computer program product comprising a computer readable storage medium having program instructions embodied therewith, the program instructions executable by a computer system to cause the computer system to perform a method of:

applying, by the computer system, security criteria to the repository under evaluation to obtain a set of metrics for the repository under evaluation, wherein the repository under evaluation is used to form a software container;

comparing, by the computer system, the set of metrics for the repository under evaluation with a trust baseline based on a set of trusted repositories to form a comparison;

determining in real-time, by the computer system, a recommendation for the repository under evaluation using the comparison, wherein determining the recommendation for the repository under evaluation comprises:
- generate a set of scores for the repository under evaluation from the comparison;
- determine whether to the repository under evaluation is a trusted repository using by applying an acceptance tolerance to the score;
- determine a recommendation for the repository under evaluation based on whether the repository under evaluation is a trusted repository; and responsive to a determination that the repository under evaluation is a trusted repository, distribute, by the computer system, the software container to a destination in a cloud environment.

* * * * *